March 24, 1970   H. A. BOULAY ET AL   3,502,256
APPARATUS FOR CLOSING AND STAPLING CARTONS VARYING IN SIZE
Filed Dec. 8, 1966   17 Sheets-Sheet 1

INVENTORS
HENRI A. BOULAY
JOSEPH SILVA
BY Cushman, Darby & Cushman
ATTORNEYS

March 24, 1970  H. A. BOULAY ET AL  3,502,256
APPARATUS FOR CLOSING AND STAPLING CARTONS VARYING IN SIZE
Filed Dec. 8, 1966  17 Sheets-Sheet 2

INVENTORS
HENRI A. BOULAY
JOSEPH SILVA
BY Cushman, Darby & Cushman
ATTORNEYS

March 24, 1970  H. A. BOULAY ET AL  3,502,256
APPARATUS FOR CLOSING AND STAPLING CARTONS VARYING IN SIZE
Filed Dec. 8, 1966  17 Sheets-Sheet 5

INVENTORS
HENRI A. BOULAY
JOSEPH SILVA

BY
ATTORNEYS

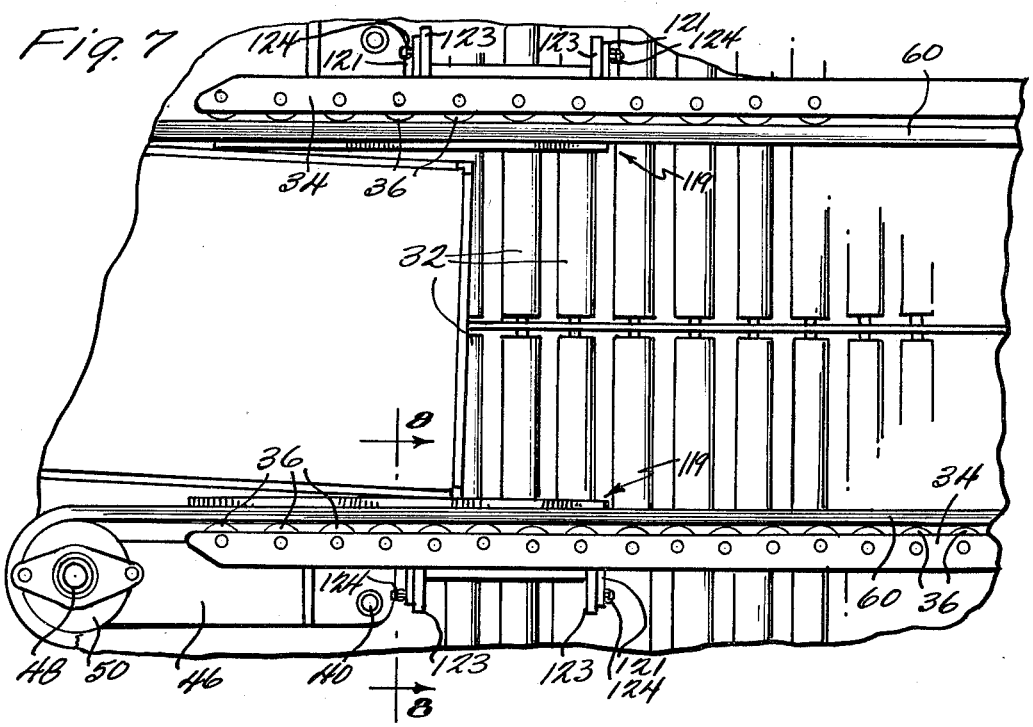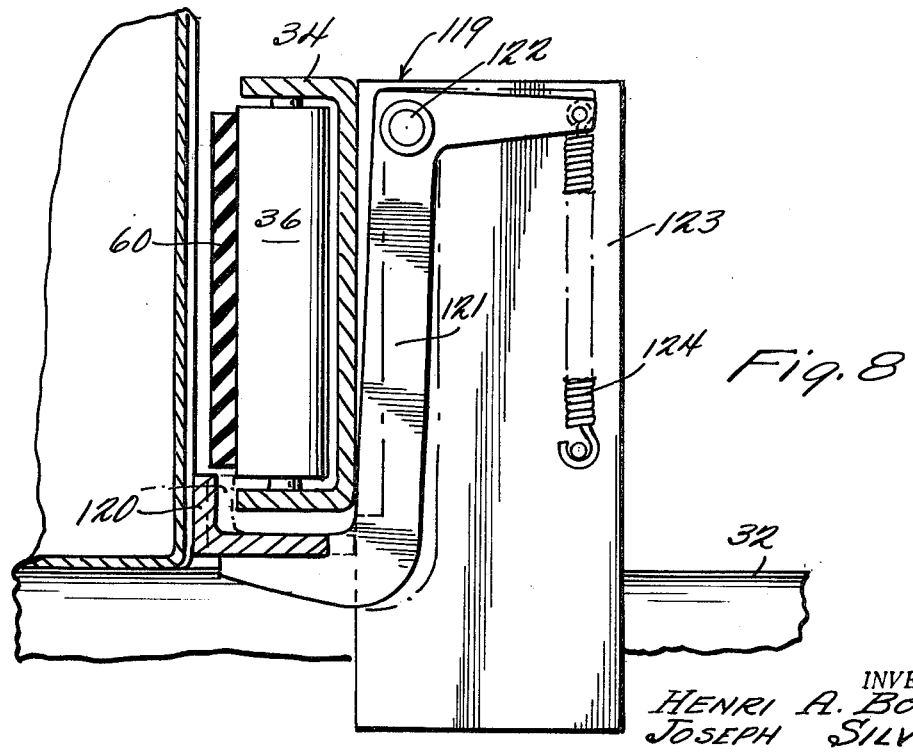

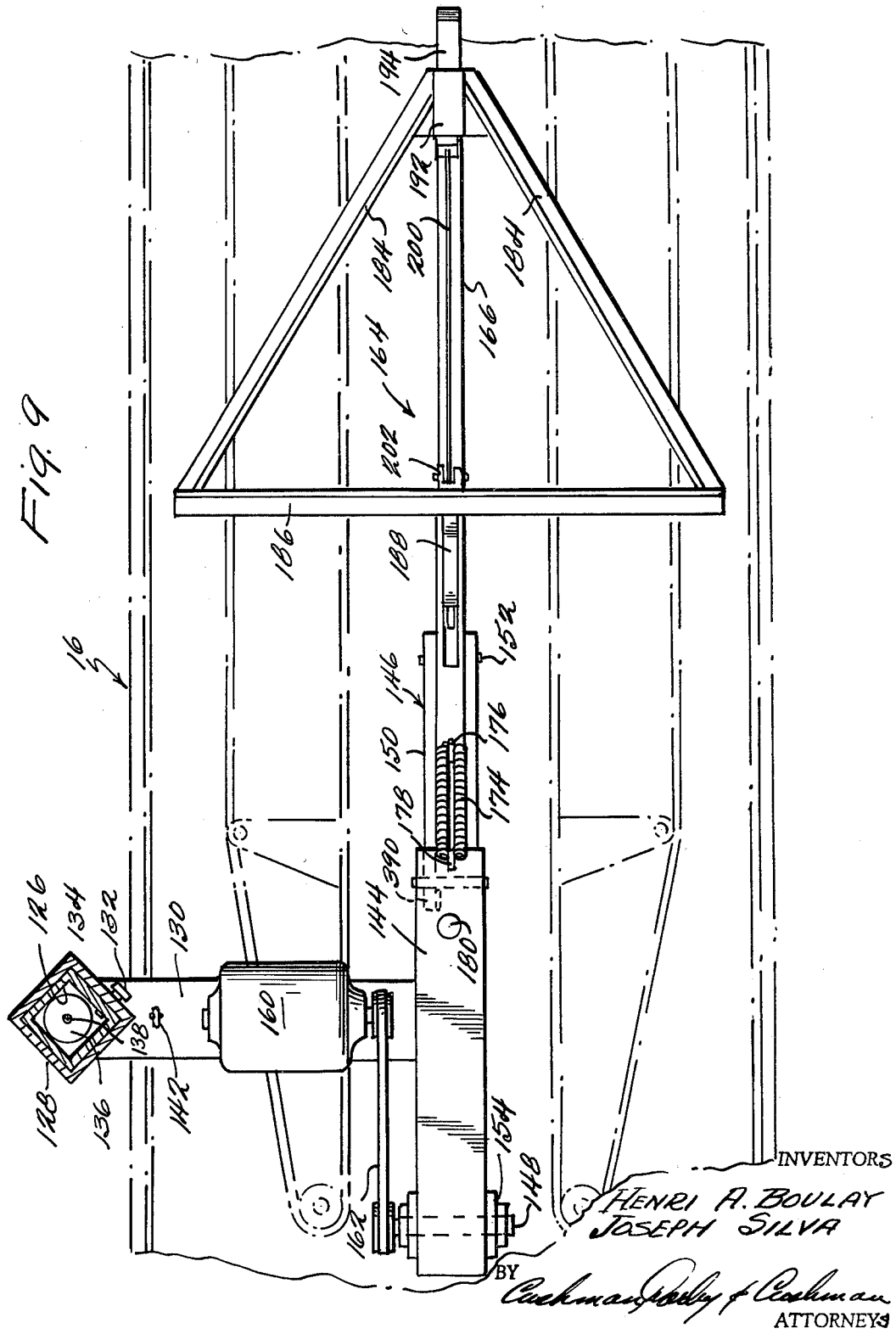

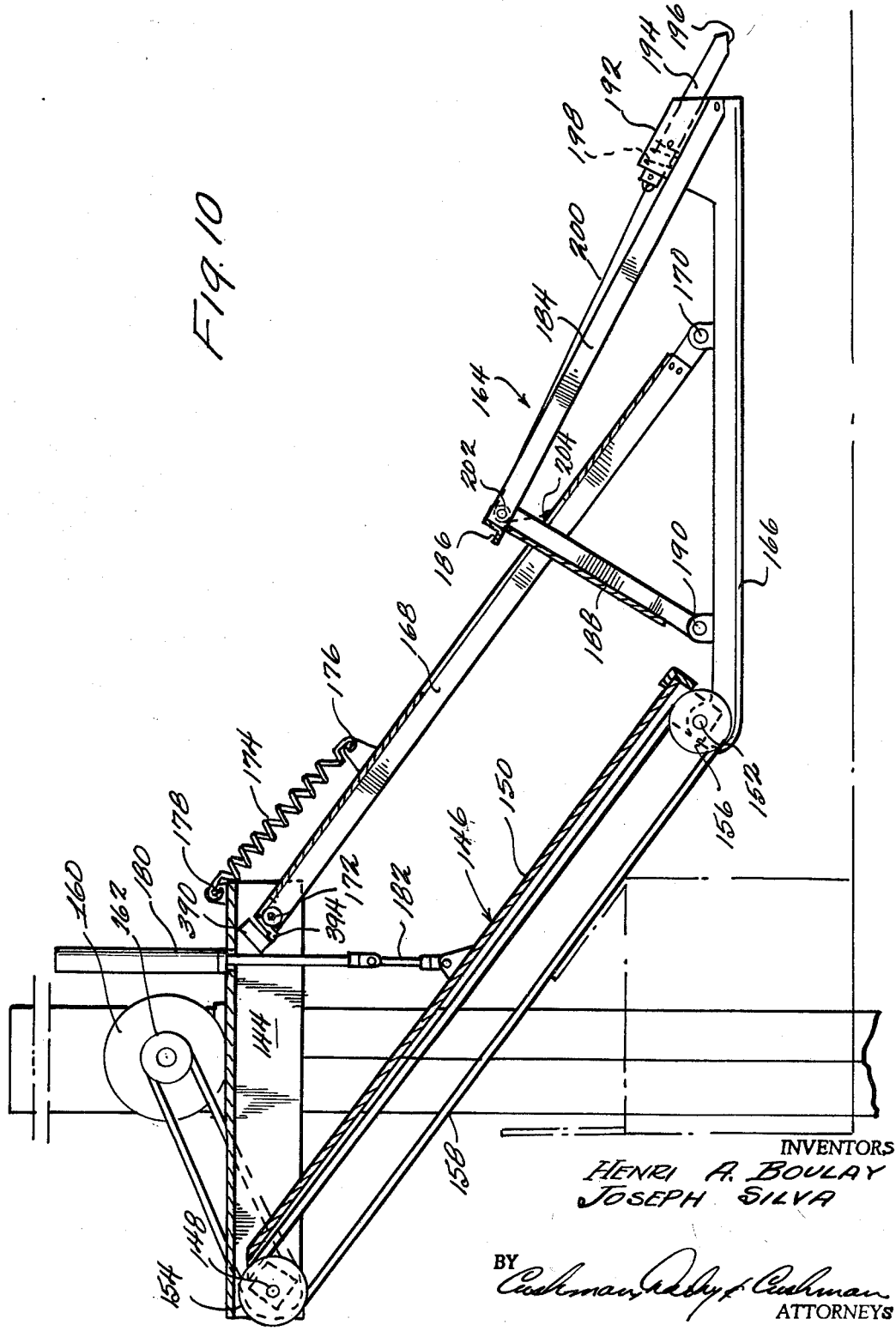

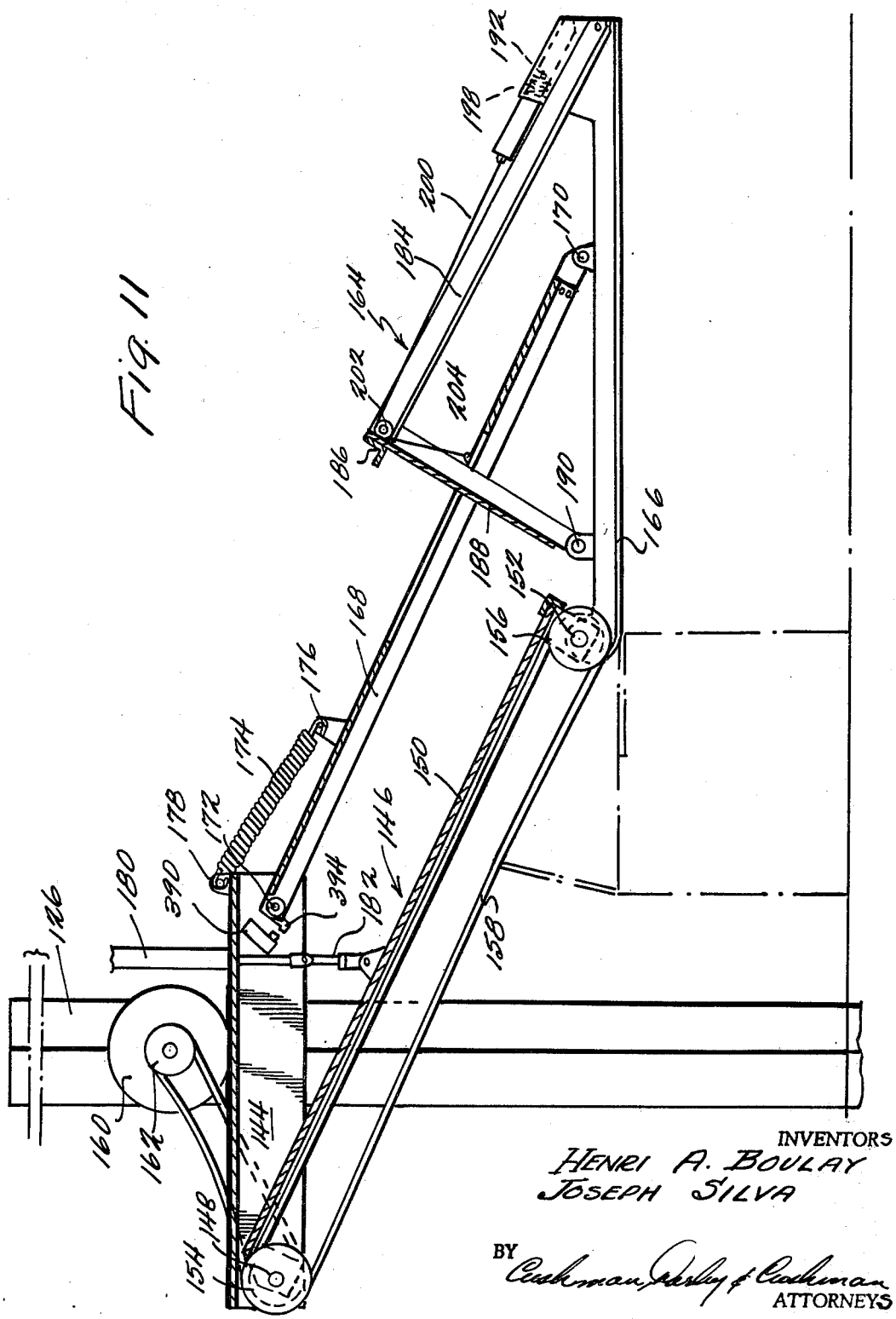

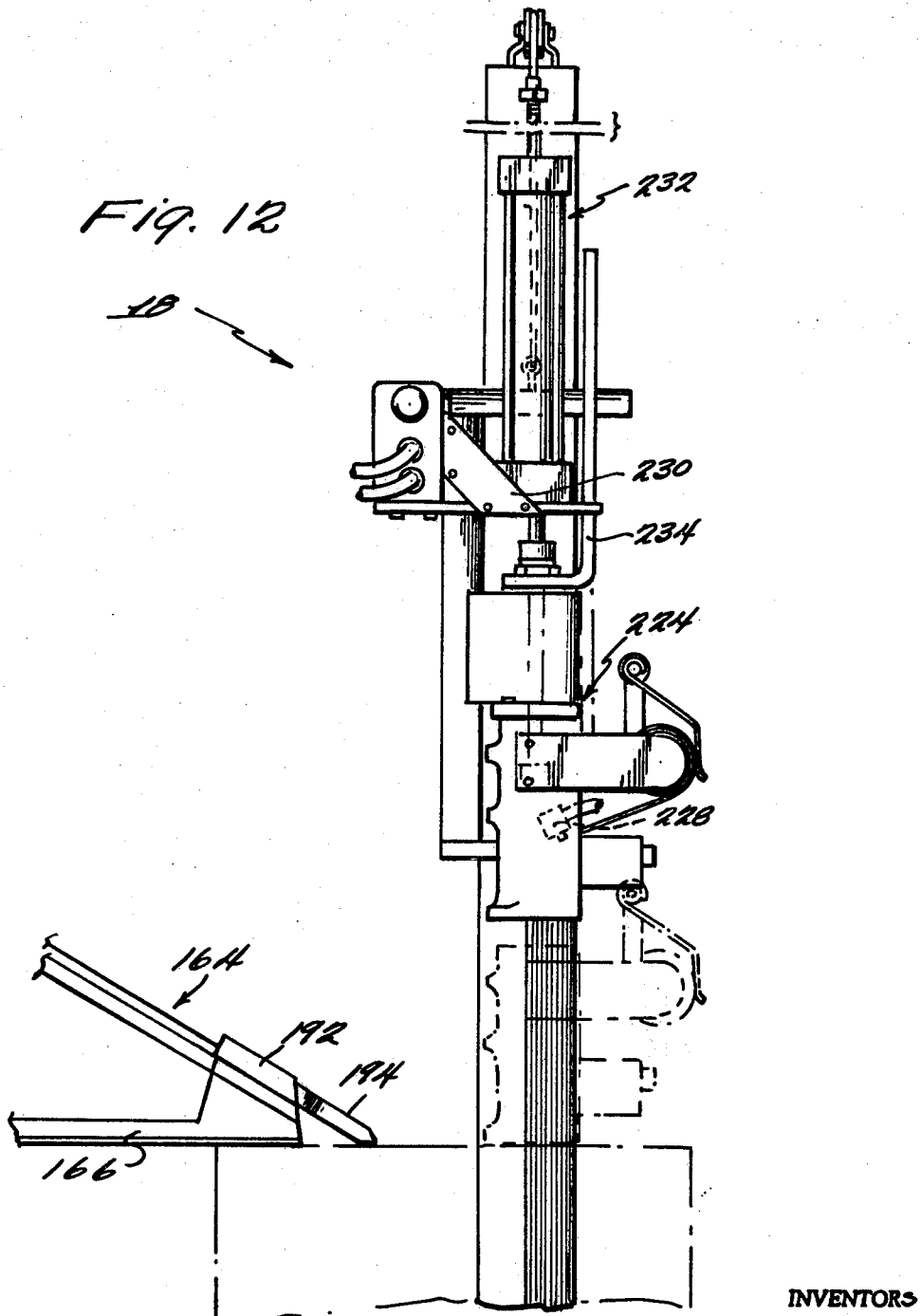

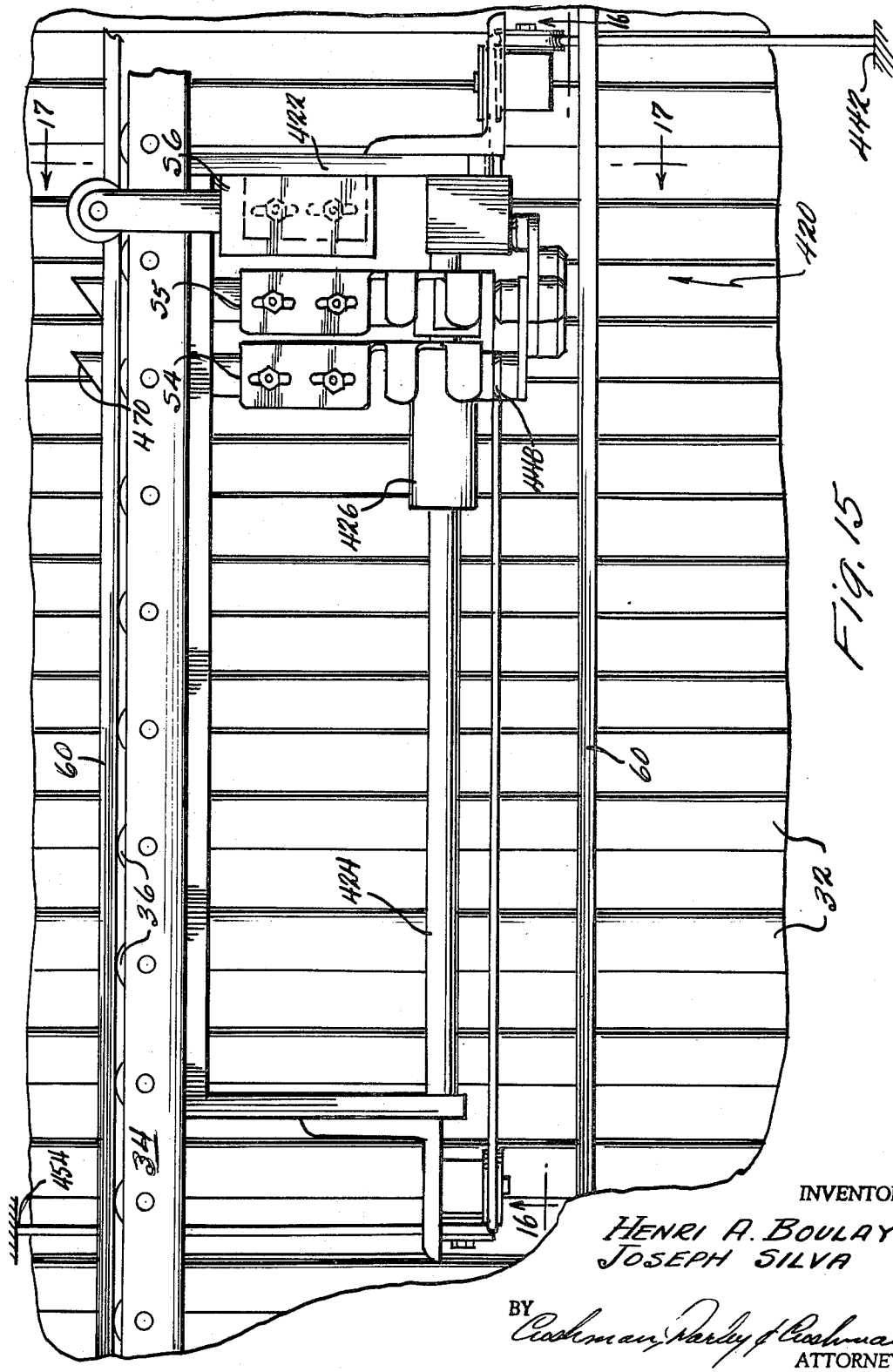

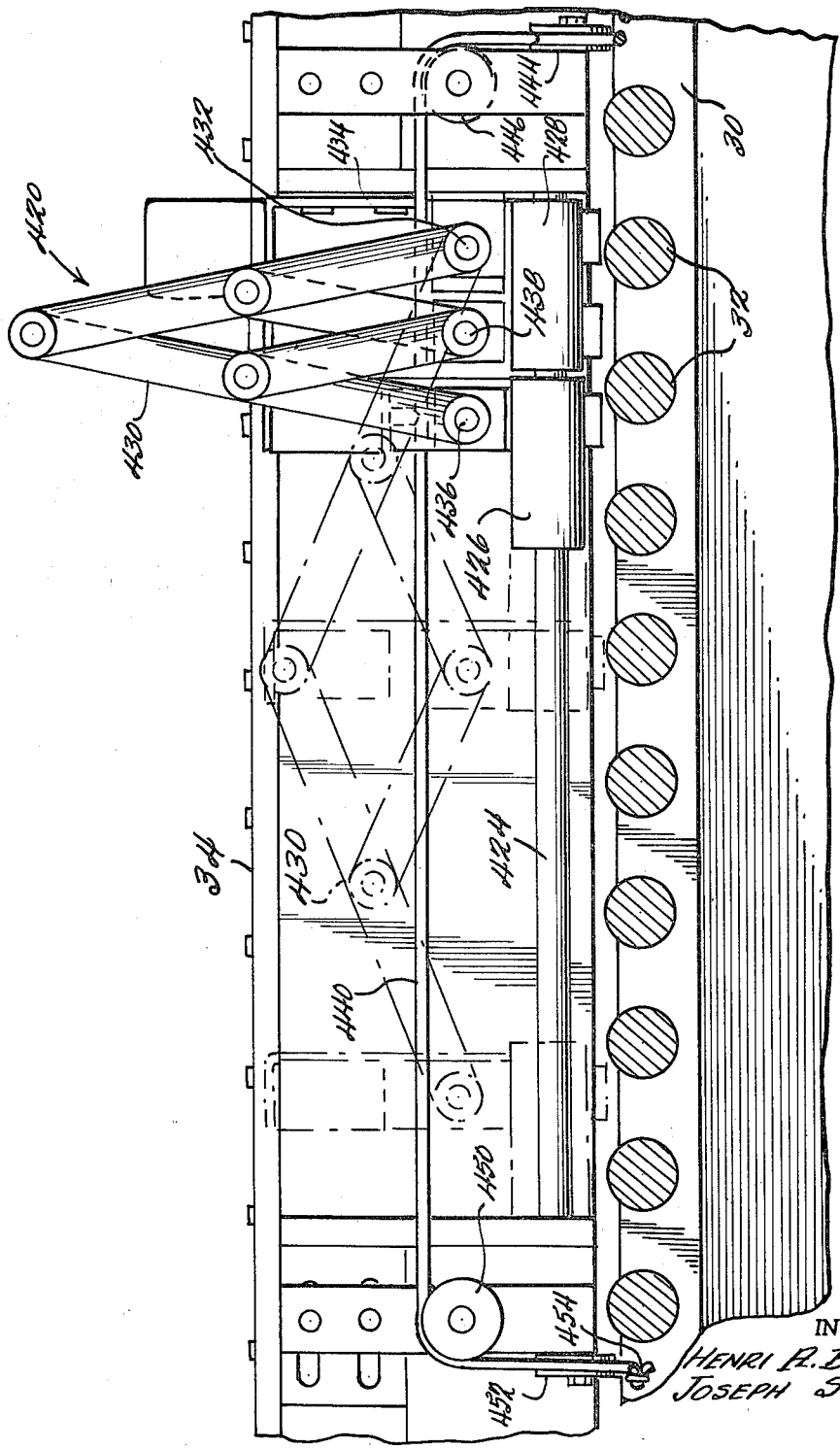

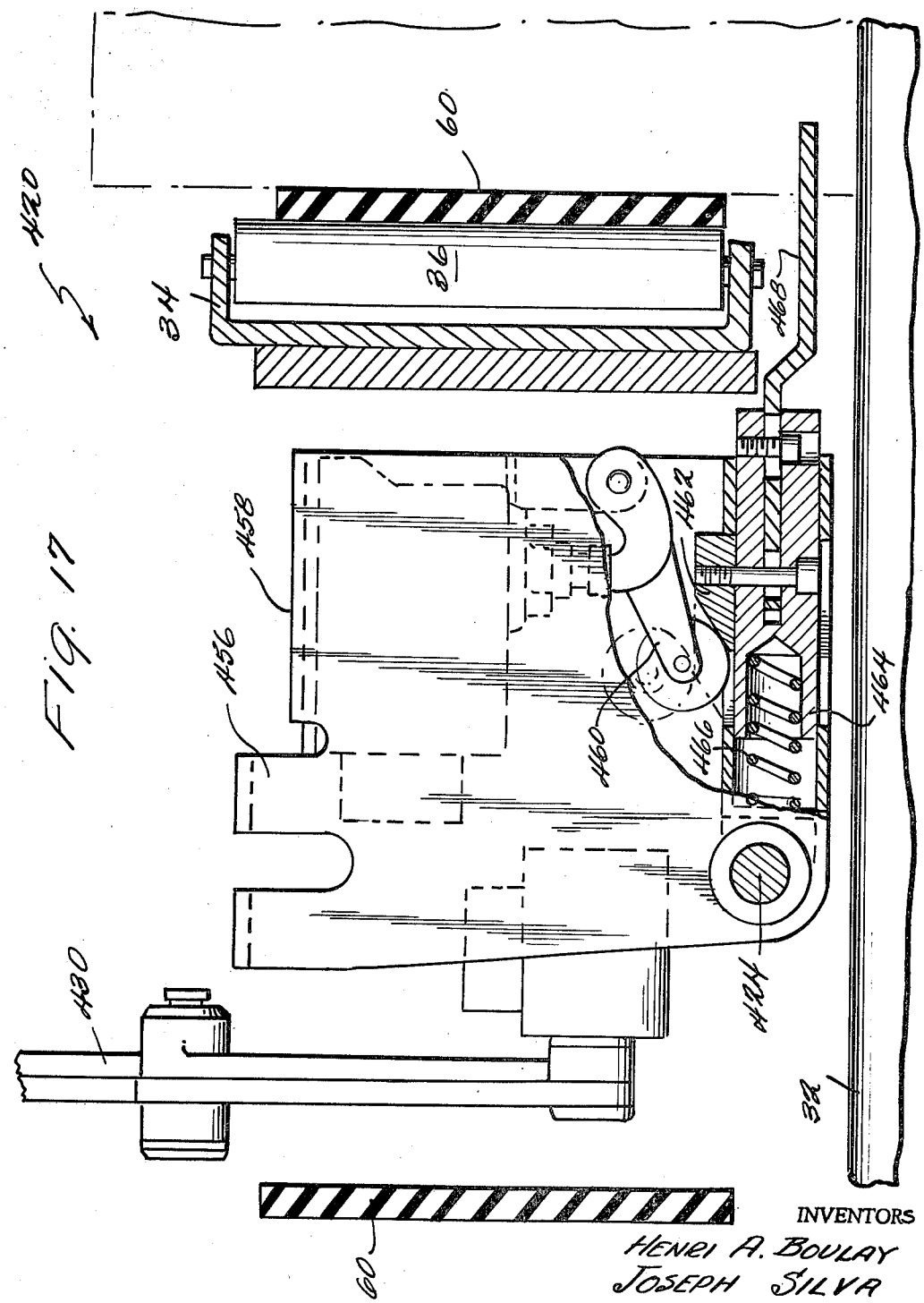

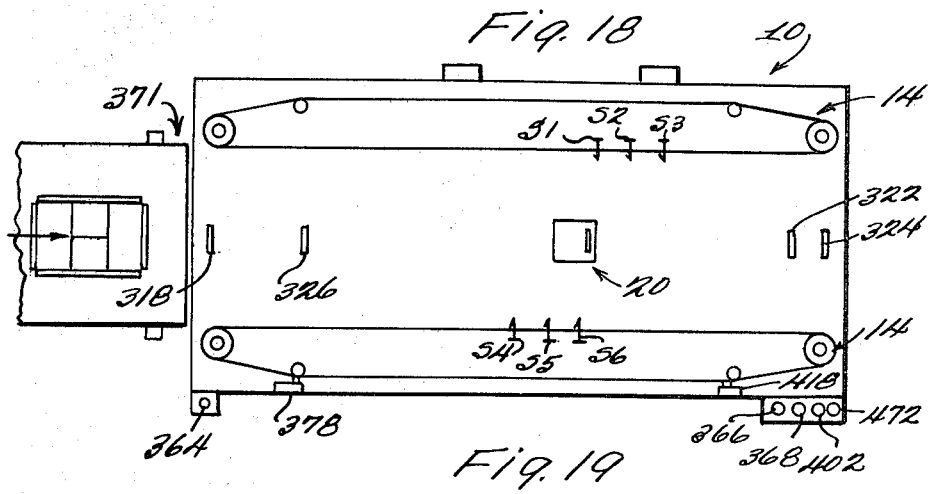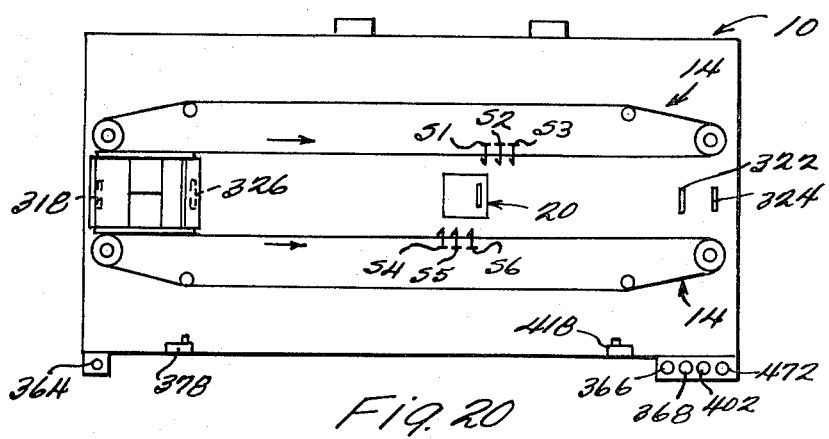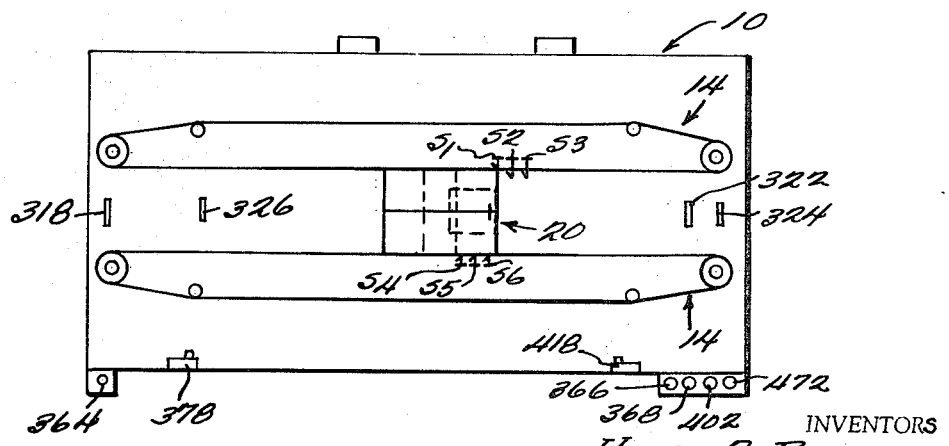

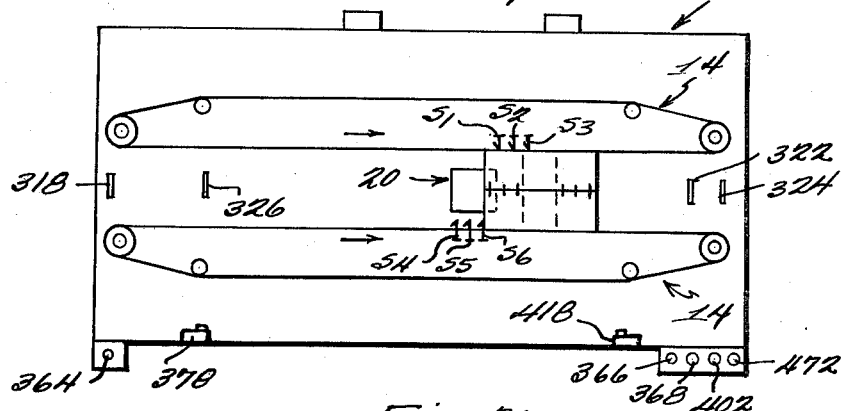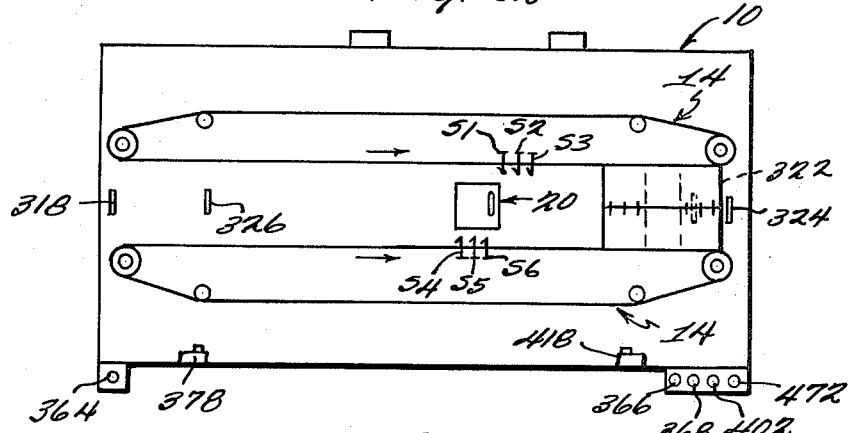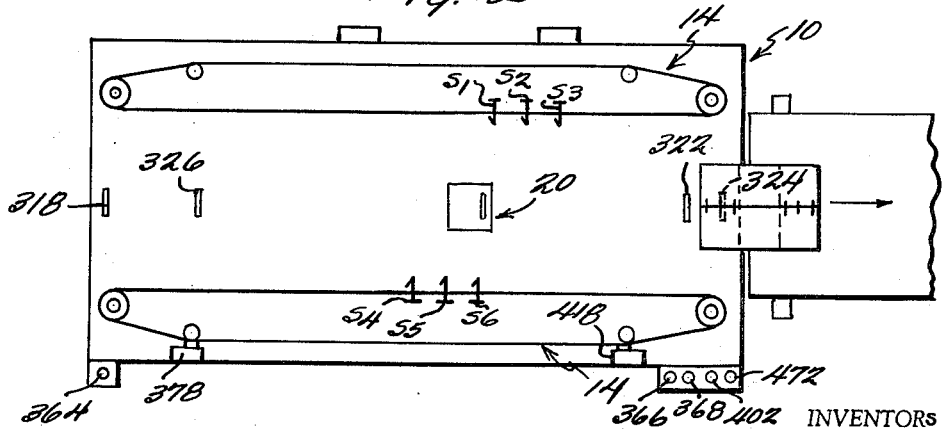

United States Patent Office 3,502,256
Patented Mar. 24, 1970

3,502,256
APPARATUS FOR CLOSING AND STAPLING CARTONS VARYING IN SIZE
Henri A. Boulay, West Warwick, and Joseph Silva, Cranston, R.I., assignors to Bostitch Division of Textron, Inc., East Greenwich, R.I., a corporation of Rhode Island
Filed Dec. 8, 1966, Ser. No. 600,163
Int. Cl. B21j 15/28; B27f 7/06; B25c 5/00
U.S. Cl. 227—7                                                  10 Claims

ABSTRACT OF THE DISCLOSURE

The specification discloses an apparatus for closing and stapling cartons of varying sizes of the type having a pair of end flaps and a pair of side flaps, which when opened are disposed in a coplanar relationship with respect to the side walls of the carton, the dimensions of the flaps measured in the direction of the outward extent thereof being generally equal to one half the width of the carton. The apparatus includes means for automatically feeding successive open-topped cartons of varying size through the apparatus, during which a flap closing mechanism is operable to close the open top flaps and a staple driving means is operable to drive staples into the closed top flaps to secure them in a closed relation. The staple driving means cooperates with the conveying means for moving successive cartons through the apparatus and with a carton width sensing means to automatically position the carton in stopped relation with respect to the staple driving means in a plurality of different positions at which staples are driven, the arrangement being operable to automatically drive staples into the side flaps and the underlying end flaps only of each successive carton at positions spaced longitudinally in accordance with the width of the carton, the staples associated with each end flap being spaced apart a distance not exceeding a predetermined distance and at least one of which is within approximately one inch from the adjacent end of the carton.

---

This invention relates to container closing and sealing machines and more particularly to apparatus for automatically closing the flaps of successive cartons of various sizes and sealing the flaps in closed relation with fasteners, such as staples or the like.

In the packaging industry, fiberboard cartons have been used for many years and various machines have been developed which are capable of closing the flaps of the carton after the carton has been filled and of sealing the carton either by gluing the flaps, taping the flaps, or by stapling or otherwise providing mechanical fasteners to maintain the flaps in closed relation.

When dealing with standard fiberboard cartons of the type including side flaps which, when folded into closed relation, meet or substantially meet along their free edges in a vertical plane passing through the longitudinal axis of the carton, it is important to provide staples which bridge the free edges of the side flaps and extend within or through the end flaps disposed therebelow. Depending upon the length of the carton, there may be a substantial gap between the free edges of the end flaps and within the area of this gap no staples are required as they are considered to be ineffective in securing the carton in closed relation.

Machines which are capable of automatically accommodating any size carton of the above mentioned standard type within a predetermined range which are fed thereto have been proposed. Such machines conventionally include a carton conveying mechanism which is capable of receiving filled open cartons and conveying them to a stapling station during which movement the open top flaps are closed. Such prior art machines embody means for automatically accomplishing a stapling cycle which may include stopping the conveying mechanism when the carton is at a first stapling position, actuating the stapling heads while the carton is stopped, and then restarting the conveying mechanism. The stapling cycle is then automatically repeated at predetermined stapling positions.

In the machines heretofore proposed, the stapling positions at which the staples are driven into the end flaps of the carton are determined by means engageable with the leading end and trailing end of the carton at predetermined fixed position of movement. Consequently, with this arrangement the positions of the staples in the end flaps are fixed and cannot be automatically varied to accommodate variations in the size of the end flaps of the cartons fed to the machine. Where the cartons to be sealed are intermixed as to size, this lack of automatic accommodation introduces considerable down time for manual adjustment, materially reducing the efficiency of the machine.

The Uniform Freight Classification Code includes quite exacting specifications as to the positions of staples in the end flaps of a carton to obtain an approvable securement. For example, the code specifies that staples must be positioned within the end flaps at each end of the carton within an approximate one inch maximum distance, and that the maximum spacing between adjacent staples within each end flap must not exceed five inches. Moreover, it is desirable to position staples in the end flaps adjacent their free edges, as, for example, within a spacing of a maximum of approximately one inch from the free edge.

It can thus be seen that these optimum and required conditions as to the positioning of the staples in the end flaps cannot be obtained in a wide range of varying box size widths by simply fixing the spacing between the stapling positions for each end flap as is the case with prior art machines. For example, if the machine is set up to drive two staples at two fixed positions; one, approximately one inch from the end, and the second approximately two inches from the first, it can be seen that as the size of the end flap increases a substantial area adjacent the free edge of each end flap will remain unstapled. A twelve inch end flap would have no staple within the area nine inches from its free edge and this condition would increase as the size of the end flap increases. Attempts to alleviate this condition by reducing the fixed distance between adjacent staples to thereby compensate for the larger cartons invariably lead to the utilization of more staples than necessary, thus materially increasing the staple costs and the time required to effect the stapling operations. Consequently, the machines of the prior art are either severely limited in the size range of the cartons which can be accommodated or over compensate in order to provide sufficient staples to accommodate a greater range thereby decreasing efficiency as to the optimum number of staples used and the time required to effect the stapling operation.

An object of the present invention is the provision of a machine for automatically stapling the flaps of a carton in closed relation having means for automatically varying the position at which the staples are secured within the end flaps of the carton to accommodate variations in the end flap size of the cartons fed to the machine.

In accordance with the principles of the present invention, this object is accomplished by initially sensing or measuring the width size of the box fed to the machine and of varying the location of the means which determines the position at which the staples are driven into the carton in accordance with the width of the carton measured or sensed. Standard cartons are such that the extent of the end flaps in the longitudinal direction with respect to the carton when in closed condition is equal to one-half of the width of the carton, since this dimension of the end flaps is equal to the transverse extent of the side flaps when closed and this dimension of the side flaps is substantially one-half of the width. Consequently, by measuring the width of the box the longitudinal extent of the end flaps when closed can likewise be determined and the positions of the staples varied accordingly. Thus, a machine constructed in accordance with the present invention embodying such capability will accommodate cartons which vary in size within a greater range than the range which prior art machines can accommodate while at the same time insuring the proper positioning of an adequate number of staples in accordance with acceptable requirements.

In accordance with the principles of the present invention the variation in the positions within which the staples are driven is generally proportionate to the width of the carton. It will be noted, however, that in accommodating end flap sizes within a range of, for example, three inches to twelve inches, if three staples are provided in each twelve inch end flap with a spacing between adjacent staples of five inches, the spacing between staples in a three inch end flap would be less than one inch if a strict width proportion spacing were adhered to. Thus, where the variation is strictly adhered to in proportion to the width of the carton, one of two conditions would exist, first, in the lower size ranges, more staples would be utilized than required, or two, in the upper size ranges less staples than required would be utilized. In accordance with the principles of the invention, the optimum desired number of staples is automatically determined to be utilized in accordance with the measured width of the carton fed thereto.

Accordingly, it is a further object of the present invention to provide a machine of the type described having means for varying the number of positions at which staples are driven into the end flaps of the carton in accordance with the measured width of the carton fed thereto.

A further object of the present invention is the provision of a machine of the type described having means manually operable for selectively rendering the machine capable of driving only a single staple into each end flap of the carton adjacent each end of the carton. While the machine of the present invention is thus capable of automatically accommodating a wide range of carton width sizes and automatically driving staples into the end flaps thereof of an optimum number and of optimum spacing to meet Uniform Freight Classification Code requirements, in some instances particularly with small width cartons where only a minimum closure of the carton is desired, or where the cartons to be closed are not subject to subsequent freight regulations, it is desirable to maintain the top and bottom flaps in closed relation simply by the utilization of two staples in the top and bottom respectively positioned adjacent each end of the carton.

A further object of the present invention is the provision of a machine of the type described having means operable in response to manual selection for rendering the machine capable of driving only a single staple into each end flap.

Another object of the present invention is the provision of a carton closing and sealing machine of the type described in which variations in the height size of the cartons fed thereto are accommodated independently at the flap folding station and at the stapling station, the flap folding mechanism being normally disposed in a lowermost position and movable into operative position to accommodate the particular height size of the carton fed thereto by movement of the carton into engagement with the flap folding mechanism by the conveying mechanism of the machine, the top stapling mechanism of the machine being normally disposed in an uppermost position and movable downwardly into an operative position to accommodate the particular height size of the carton fed thereto in response to the engagement of the stapling mechanism with the carton during its downward movement.

Still another object of the present invention is the provision of a flap folding mechanism of the type described useful in carton sealing machines of the gluing and taping type, as well as the stapling type, which embodies a power-driven endless belt having an operative flight extending downwardly and in the direction of carton movement at a lowermost initial position so as to engage the upper leading end of the carton and the leading end flap extending thereabove during the movement of the carton by the conveying mechanism so that during the subsequent movement of the carton after engagement, the leading end flap will be folded by the operative flight by the belt into closed position and the operative flight of the belt will be moved through engagement of the upper end of the carton therewith during its movement into a rear flap folding position wherein the entire belt is disposed above the upper leading end of the carton and means for actuating the belt to drive the operative flight in a direction downwardly and in the direction of carton movement at a speed greater than the speed of carton movement so as to effect the inward closing of the trailing end flap during the movement of the carton by the conveying mechanism.

Still another object of the present invention is the provision of a top flap stapling mechanism of the type described having improved means for effecting downward movement of the mechanism from an initial position toward the top of a carton disposed therebelow, and improved means for stopping the downward movement of the mechanism in response to the engagement of the mechanism with the top of the carton.

The machine of the present invention embodies a pair of transversely spaced conveying mechanisms for effecting the movement of successive cartons through the machine. The conveying mechanisms each comprise endless belt assemblies which are removable toward each other from an initial position to engage the sides of a carton fed to the machine and to convey such carton through the machine. Where two opposed live belts are utilized to positively move the carton through the machine, it is important to insure that each successive carton will be properly oriented with respect to the inwardly moving live belts, otherwise the vertical walls of the carton may be distorted in the manner of a parallelogram resulting in the securement of the flaps thereto in a relationship which maintains the distorted configuration of the vertical walls.

When dealing with cartons which vary in size it is not always possible to insure that successive cartons will be delivered to the machine in proper oriented relation. For example, if the carton is fed to the machine with its longitudinal axis at an angle to the longitudinal axis of the machine, it is necessary to orient the carton so that both longitudinal axes are in alignment prior to the movement of the carton through the machine, otherwise the condition mentioned above will take place. The conveying action of a pair of carton side engaging belt assemblies is dependent upon a tight frictional engagement between the belts and the sides of the carton and consequently, orientation of the carton after the belts have contacted the carton becomes a somewhat difficult operation since such orientation requires relative movement between the carton and the carton engaging surfaces of the belts.

Accordingly, it is a still further object of the present invention to provide a conveying mechanism of the type described having improved means for alleviating the driving frictional contact between the belt assemblies and the carton during the initial engagement of the belt assemblies with the carton as they move inwardly so as to cause the cartons to assume a properly oriented relation between the belt assemblies during their subsequent movement through the machine.

These and other objects of the present invention will become more apparent during the course of the following detailed description and appended claims.

The invention may best be understood with reference to the accompanying drawings wherein an illustrative embodiment is shown.

In the drawings:

FIGURE 7 is an enlarged fragmentary top plan view of the carton receiving end of the conveying mechanism of the machine, illustrating the manner in which the carton orienting mechanism operates;

FIGURE 8 is a fragmentary sectional view taken along the line 8—8 of FIGURE 7;

FIGURE 9 is an enlarged fragmentary top plan view of the flap folding mechanism of the machine;

FIGURE 10 is a side elevational view of the flap folding mechanism, showing the same in its normal inoperative or lowermost position;

FIGURE 11 is a view similar to FIGURE 10 showing the flap folding mechanism in its operative rear flap folding or raised position;

FIGURE 12 is a side elevational view of the top stapling mechanism;

FIGURE 15 is an enlarged fragmentary top plan view of the mechanism for varying the position at which the staples are driven into the rear or trailing end flap of the carton;

FIGURE 16 is a sectional view taken along the line 16—16 of FIGURE 15;

FIGURE 17 is an enlarged fragmentary sectional view taken along the line 17—17 of FIGURE 15;

FIGURES 18 through 23 are schematic top plan views illustrating various functions applied to the carton during its movement through the machine.

GENERAL CONSTRUCTION AND OPERATION OF THE MACHINE

Figure 1:
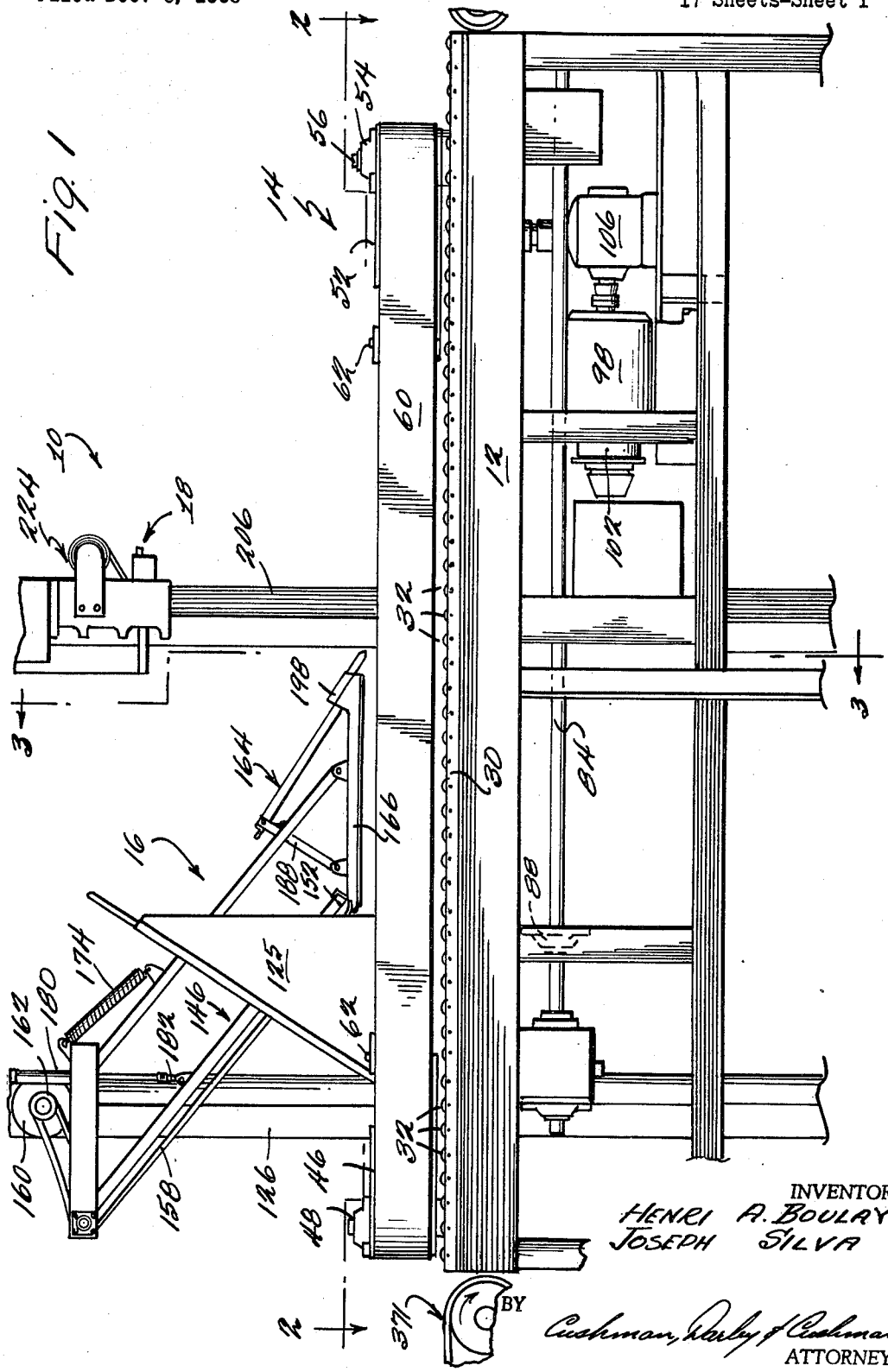
FIGURE 1 is a side elevational view of a carton closing and stapling machine embodying the principles of the present invention.

Referring now more particularly to FIGURES 1-4 of the drawings, there is shown therein a machine or apparatus, generally indicated at 10, embodying the principles of the present invention. In general, the machine includes a horizontally elongated frame assembly, generally indicated at 12, arranged to receive at one end successive open cartons and a carton conveying mechanism in the form of a pair of transversely spaced carton side engaging endless belt assemblies 14 mounted on the frame assembly 12 for movement toward and away from each other for effecting movement of successive cartons fed to the carton receiving end of the frame longitudinally to the opposite end of the frame assembly for discharge from the machine.

The machine 10 also includes a top flap folding mechanism, generally indicated at 16, mounted adjacent the receiving end of the frame for sequentially folding the leading end flap, the trailing end flap, and the side flaps of successive open cartons into closed relation during their movement through the machine by the conveying mechanism 14. The flap folding mechanism 16 also serves to maintain the top flaps in closed relation during the driving of staples therein by a top stapling mechanism, generally indicated at 18, simultaneously with the driving of aligned staples into the closed bottom flaps by a bottom stapling mechanism, generally indicated at 20.

The machine 10 includes a fluid pressure operated circuit, generally indicated at 22 (FIGURE 13), and an electrical circuit, generally indicated at 24 (FIGURE 14), for controlling the operation of the conveying mechanism 14, the flap folding mechanism 16, and the stapling mechanisms 18 and 20 through a cycle of automatic operation with respect to each carton fed thereto. This operative cycle includes movement of the pair of belt assemblies from a spaced apart carton receiving position inwardly toward each other to engage the sides of a carton fed to the receiving end of the frame assembly 12 to thereby move the engaged carton longitudinally through the top flap folding mechanism 16, during which movement the top flap folding mechanism is operable to sequentially fold into closed relation the leading or front end flap of the carton, the trailing or rear end flap of the carton, and the side flaps of the carton, stopping the movement of the belt assemblies after the top flaps have been closed and when the cartoon has been moved to a first stapling position, actuating the top and bottom stapling mechanisms to drive staples into the top and bottom flaps of the carton in the first stapling position, reactuating the belt assemblies to move the carton away from the first stapling position, and repeating at a plurality of spaced stapling positions the actuations necessary to stop the movement of the carton in the respective stapling position to drive the staples into the top and bottom flaps of the carton and to move the carton away from the respective stapling position, and finally to move the belt assemblies out of engagement with the sides of the carton at the discharge end of the frame assembly after the stapling operations have been completed.

The machine 10 of the present invention is operable to automatically accommodate cartons of varying size within a predetermined size range and is adjustable to accommodate different size ranges. An important feature of the present invention is the manner in which the electropneumatic circuitry is operable to adjust the positions at which the staples are driven into the end flaps of the cartons to accommodate varying width sizes of cartons fed thereto within the size range which is accommodated. This variation in the stapling positions is accomplished by sensing the particular width size of the carton fed to the machine through the normal operation of the belt assemblies 14 and of utilizing the sensed width to vary the position of components of the electropneumatic circuitry which determine the stapling positions.

The utilization of the measurement of the width size is possible when dealing with standard cartons since the longitudinal extent of the end flaps when in closed position is a direct function of the width size of the carton. Thus, this dimension of each end flap is equal to the transverse extent of the side flaps when folded and this extent of the side flaps is equal to approximately one-half of the width. Consequently, the area within which the staples are to be driven into the closed carton is limited to an area adjacent each end of the carton which extends inwardly from the carton end a distance equal to substantially one-half of the width of the carton. The circuitry of the present invention is operable to proportionately move the instrumentalities which determine the stapling position in response to the sensing of the width of the carton being fed to the machine. The circuitry is also operable to vary the number of positions at which staples are to be driven in accordance ith the width of the carton sensed. Finally, the circuitry is manually selectively operable to drive only a single staple adjacent each end of the carton.

FRAME ASSEMBLY

Figure 2:
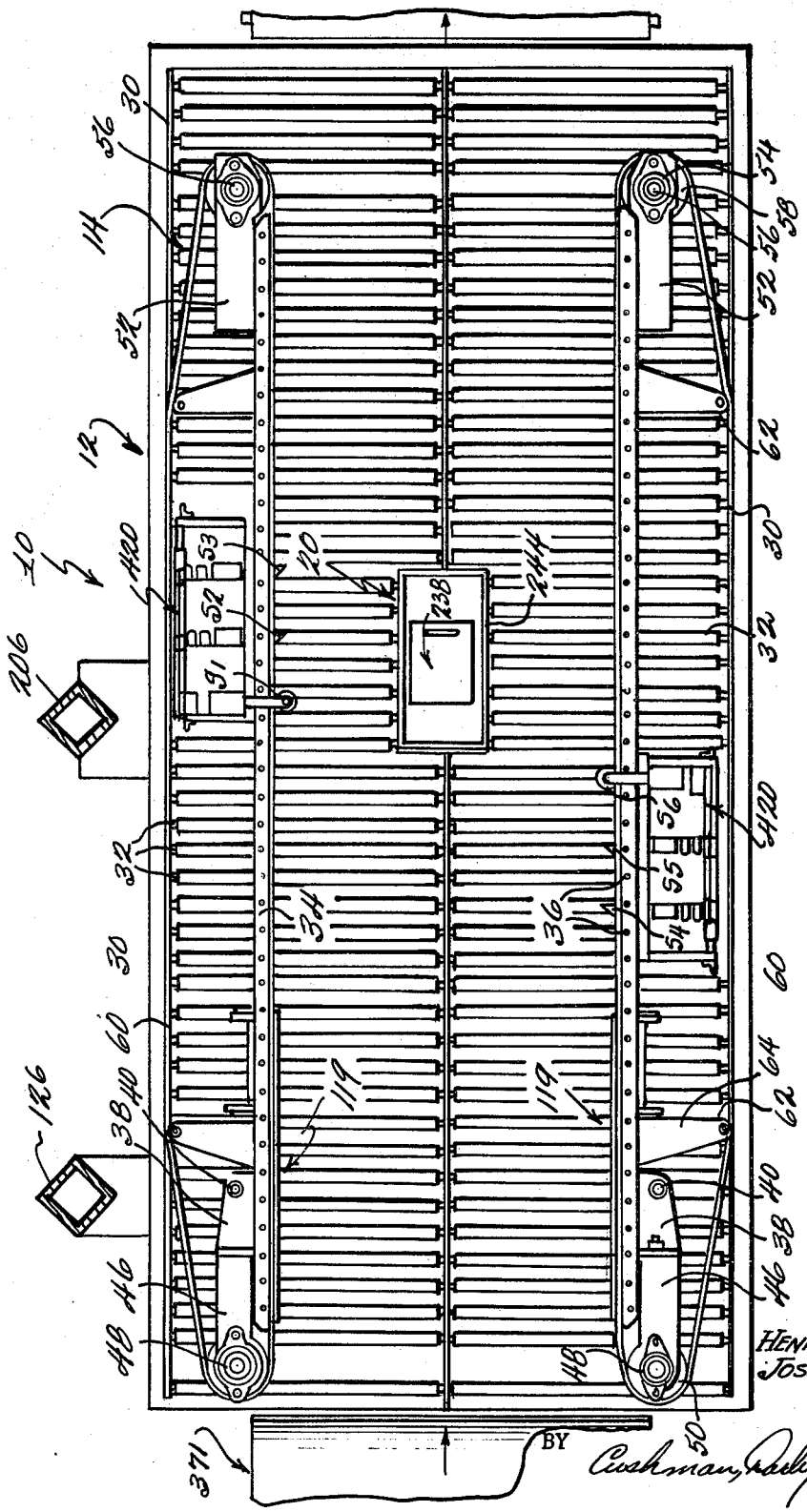
FIGURE 2 is a sectional view taken along the line 2—2 of FIGURE 1.
Figure 3:
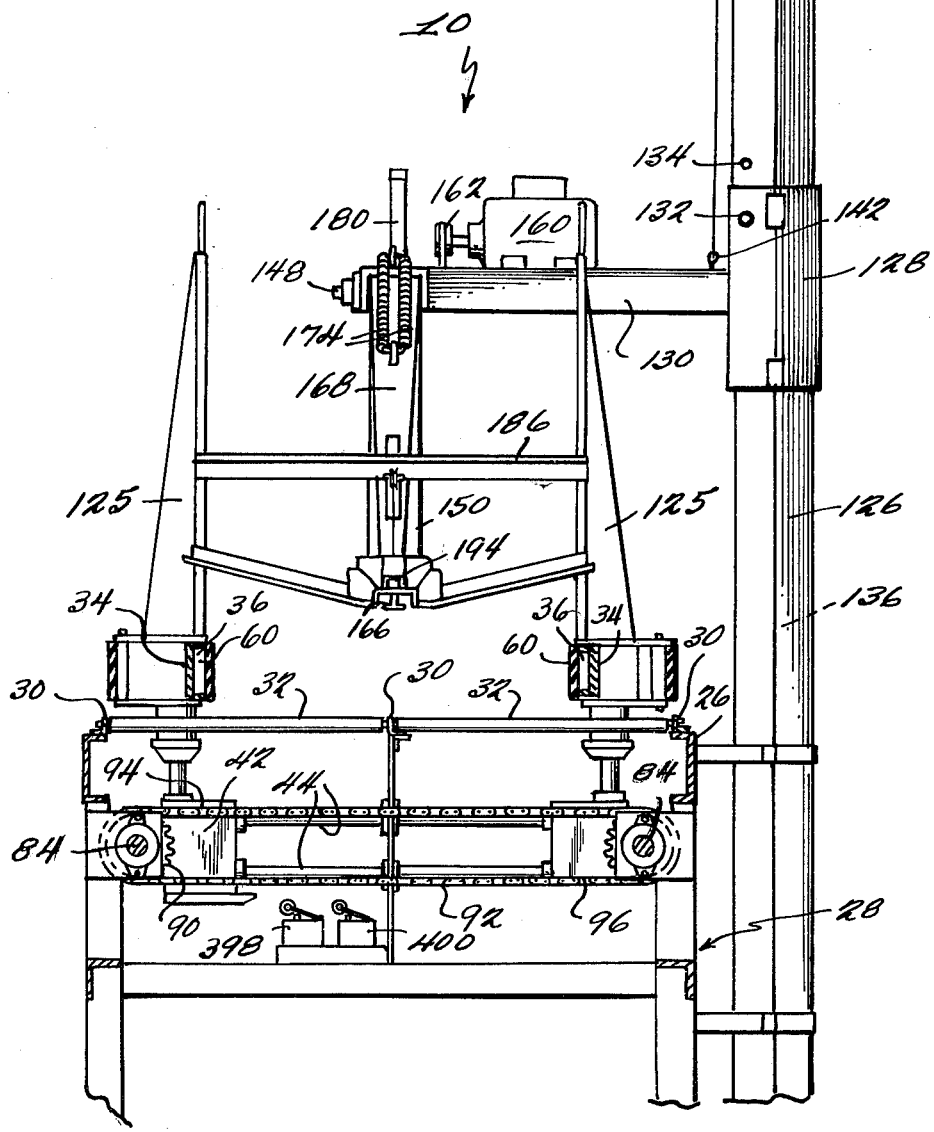
FIGURE 3 is a sectional view taken along the line 3—3 of FIGURE 1.

Referring now more particularly to FIGURES 1–3, the frame assembly 12 may be of any suitable construction and, as shown, is made up of a plurality of structural members, such as angle irons and channel beams, rigidly connected together, as by welding or the like, to form a generally horizontally extending bed frame section 26 supported above the ground by leg sections 28. Mounted on the frame bed are three transversely spaced longitudinally extending angle irons 30, the upright flanges of which are formed with a series of openings for rotatably receiving the shaft ends of a plurality of carton supporting rollers 32. The rollers 32 are mounted with their upper peripheries disposed in a common horizontal plane and serve to support the cartons fed to the machine 10 for movement thereover between the receiving end of the frame assembly and the discharge end thereof.

CONVEYING MECHANISM

The pair of endless belt assemblies 14, which preferably constitute the conveying mechanism of the machine, are mounted on the frame assembly above the rollers 32 in equally spaced relation from the longtudinal axis or center plane of the frame assembly for movement toward and away from each other. Since both belt assemblies 14 are of similar construction, one being a mirror image of the other, a description of one should suffice to give an understanding of both.

Each belt assembly 14 includes a main frame member 34 in the form of an inwardly opening channel beam disposed with its flanges in vertically spaced relation. The flanges of the frame member 34 are apertured at longitudinally spaced positions to receive the shaft ends of a plurality of idler rollers 36, the inner peripheries of which are disposed in a common longitudinaly extending vertical plane. Adjacent the receiving end of the frame assembly there is provided a mounting bracket 38 rigidly secured to the outer surface of the web of the channel beam 34, as by welding or the like. Fixedly secured to the mounting bracket 38 is the upper end of a shaft 40 which extends downwardly from the associated mounting bracket between the adjacent rollers 32 disposed therebelow and has its lower end portion fixedly secured, by any suitable means, within a slide block 42. As best shown in FIGURE 3, the slide block 42 includes a pair of vertically spaced horizontally extending bearings which slidably receive a pair of guide bars 44, the ends of which are fixedly secured to the frame assembly 12. Secured to the bracket 38 for longitudinal adjustment with respect thereto is a pair of rigidly interconnected vertically spaced mounting arms 46, the ends of which receive a bearing assembly 48 within which a main idler pulley or roller 50 is journalled for rotation about a vertical axis adjacent the carton receiving end of the frame assembly 12.

Adjustably mounted on the main frame member 34 adjacent the discharge end of the frame assembly is a similar pair of rigidly interconnected vertically spaced mounting arms 52. The ends of the arms 52 receive a bearing assembly 54 within which a drive shaft 56 is journalled for rotation about a vertical axis. Fixed to the drive shaft 56 between the mounting arms 52 is a drive pulley or roller 58. An endless belt 60 is trained about the drive roller 58, the inner peripheries of the idler rollers 36, the main idler roller 50 and a pair of longitudinally spaced return flight idler rollers 62 suitably journalled within brackets 64 secured to the outer surface of the main frame member 34 and extending transversely outwardly therefrom.

Figure 4:
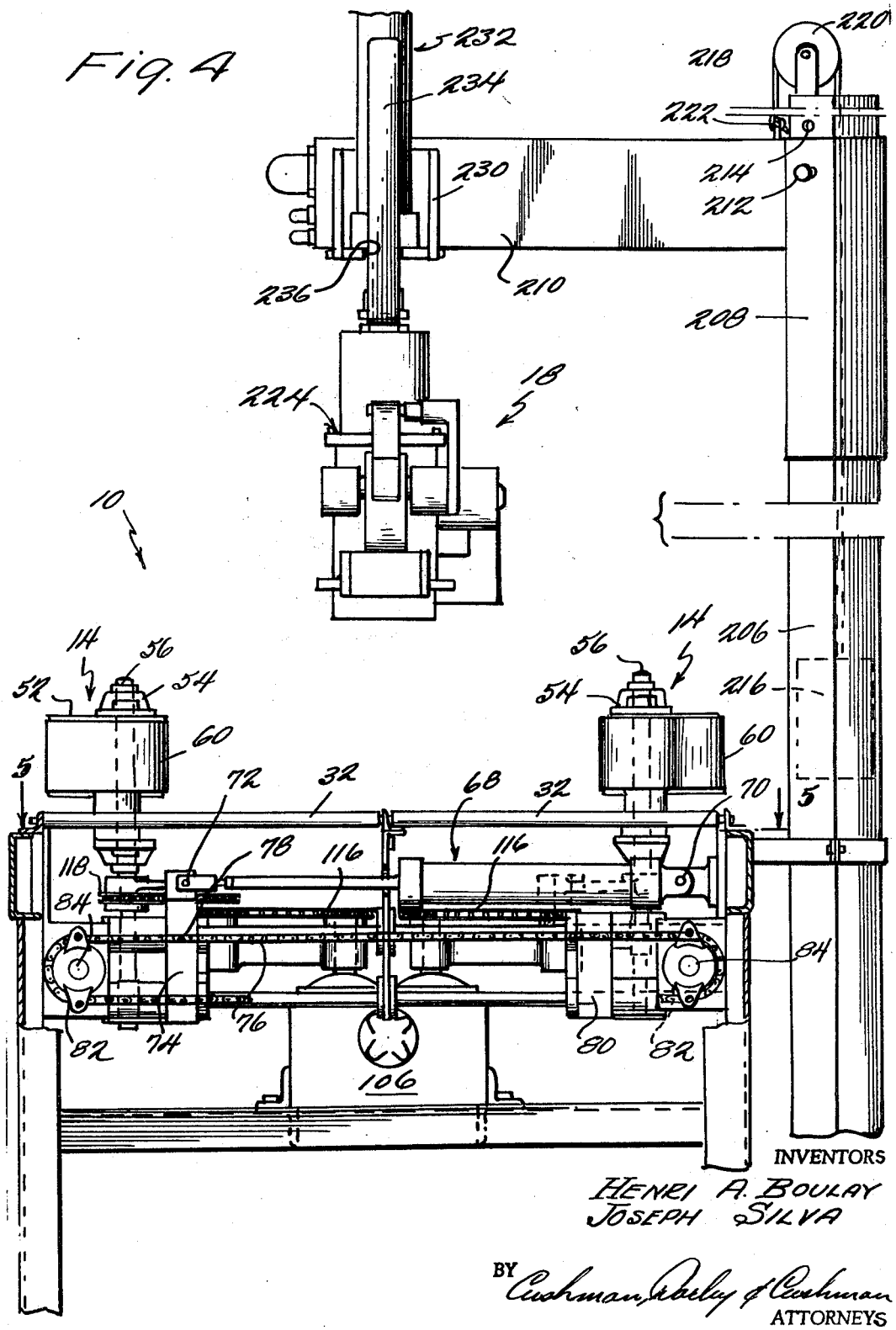
FIGURE 4 is an enlarged elevational view of the discharge end of the machine.
Figure 5:
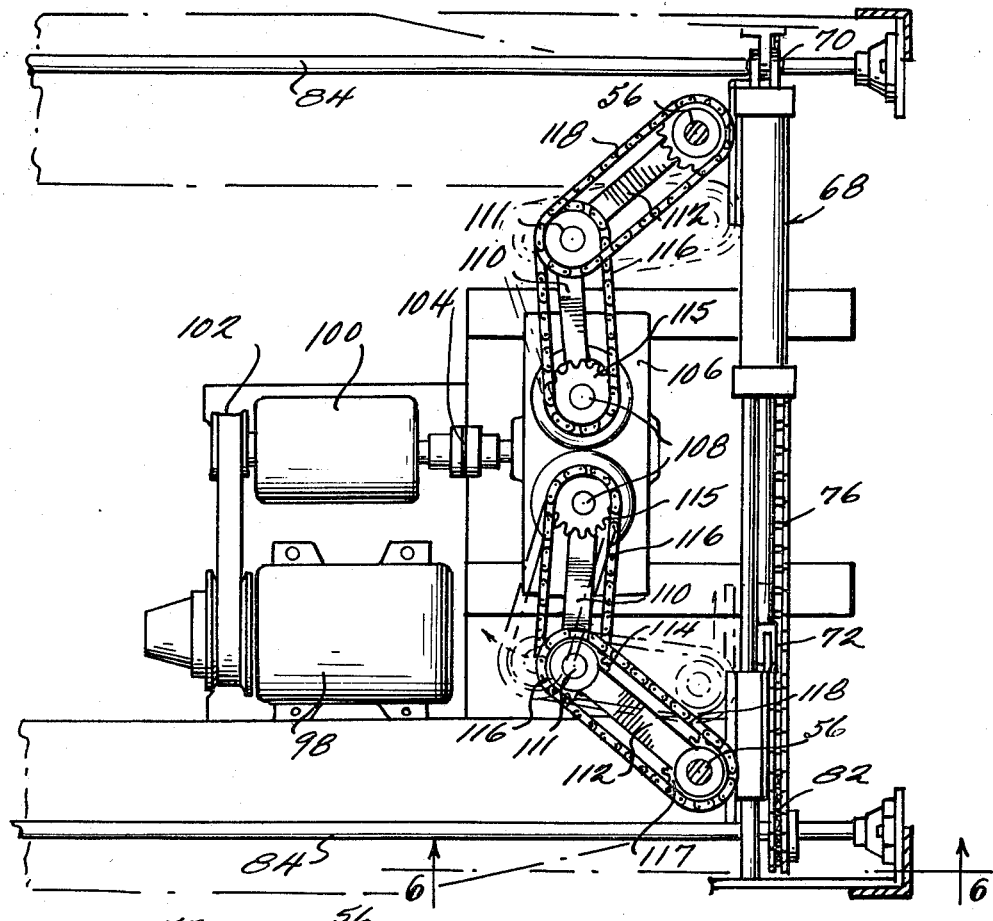
FIGURE 5 is a fragmentary sectional view taken substantially along the line 5—5 of FIGURE 4.
Figure 6:
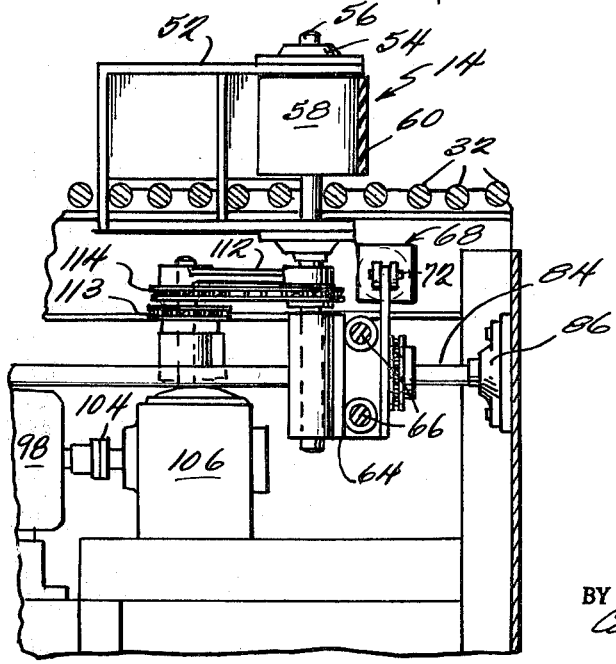
FIGURE 6 is a fragmentary sectional view taken along the line 6—6 of FIGURE 5.

As best shown in FIGURES 4–6, the drive shaft 56 extends downwardly from the drive roller 58 between the adjacent rollers 32 disposed therebelow and has its lower end portion journalled within a slide block 64, similar to the slide block 42 previously described. As before, slide block 64 is provided with a pair of vertically spaced horizontally extended bearings which slidably receive a pair of guide rods 66 the ends of which are fixedly secured to the frame assembly 12.

It can thus be seen that the slide blocks 42 and 64 serves to mount the respective belt assembly 14 on the frame assembly for transverse sliding movement with respect thereto. Means is provided for effecting a simultaneous movement of each of the belt assemblies 14 toward and away from the longitudinal axis of the frame assembly in such a way as to maintain an equal space at all times between each belt assembly and the longitudinal axis of the frame. As best shown in FIGURE 4, this means preferably includes a double-acting pneumatic piston and cylinder unit 68 of conventional construction having the cylinder thereof pivotally connected to one side of the frame assembly, as indicated at 70, and the piston rod end thereof pivotally connected, as at 72, to a bracket 74 fixed to the slide block 64 of the belt assembly on the opposite side of the frame assembly 12.

The piston and cylinder unit 68 thus serves to effect a movement of the lefthand belt assembly 14, as viewed in FIGURE 4, and this movement of the lefthand belt assembly 14 is transmitted to the righthand belt assembly 14 by elongated flexible means in the form of an endless chain 76. One link of the chain 76 is fixedly secured to the mounting bracket 74, as at 78, and the opposite link of the chain 76 is fixedly secured to the slide block 64 of the righthand belt assembly 14, as shown in FIGURE 4 and indicated at 80.

The chain 76 is trained about a pair of transversely spaced sprocket wheels 82 fixed to the adjacent end portions of a pair of shafts 84. As best shown in FIGURES 5 and 6, each shaft 84 has its adjacent extremity journalled within a bearing assembly 86 secured to the adjacent portion of the frame assembly 12 and extends toward the receiving end of the frame. The opposite end portion of each shaft 84 is journalled within a bearing assembly 88 and has its extremity extending therebeyond to fixedly receive a sprocket wheel 90, as best shown in FIGURE 3. An endless chain 92 similar to the chain 76 previously described is trained about the sprocket wheels 90 and has opposite links secured to the respective slide blocks 42, as indicated at 94 and 96.

It can be seen that extension and retraction of the piston and cylinder unit 68 will effect a transverse movement of the lefthand belt assembly 14, as shown in FIGURE 4. The transverse movement imparted to the lefthand conveying mechanism 14 is imparted to the righthand conveying mechanism 14, as shown in FIGURE 4, in the opposite direction by virtue of the connection of the chains 76 and 92 with the respective slide blocks 64 and 42.

Means is also provided for imparting a rotary motion to the drive rollers 58, which means is operable both during the transverse movement of the belt assemblies 14 and when they are in carton engaging relation. As shown, this means includes an electric motor 98 having its output shaft connected to drive the input shaft of an electromagnetic clutch-brake unit, generally indicated at 100, as by a belt and pulley assembly 102. The electromagnetic clutch-brake unit 100 may be of any conventional construction. The output shaft of the electromagnetic clutch-brake unit 100 is connected, as by coupling 104, to the input shaft of a speed reduction unit 106 of the type providing a pair of transversely spaced vertically extending output shafts 108. As best shown in FIGURES 5 and 6, each shaft 108 pivotally receives one end of a link 110, the opposite end of which rotatably receives a stub shaft 111. Journalled on each stub shaft 111 is one end of a second link 112 which, with the associated link 110, constitutes a toggle linkage. The opposite end of each link 112 rotatably receives the associated drive shaft 56. Each toggle linkage serves to support a pair of intermediate sprocket wheels 113 and 114, fixed to the associated stub shaft 111, each sprocket wheel 113 being drivingly connected with a sprocket wheel 115 fixed to the associated shaft 108, as by an endless chain 116 and each sprocket wheel 114 being drivingly connected with a sprocket wheel 117 fixed to the associated shaft 56, as by an endless chain 118.

It can thus be seen that when the motor 98 is energizing and the electromagnetic clutch-brake unit is actuated, power from the motor 98 will be transmitted to the drive shafts 56 through the output shafts 108 of the gear reducing unit 106, the sprocket and chain assembly 113, 115 and 116, and the sprocket and chain assembly 114, 117 and 118. The dual chain and toggle linkage arrangement permits transmission of the rotary movement of the motor 98 to the drive shaft 56 during transverse movement of the belt assemblies 14 under the operation of the cylinder and piston 68 in the manner previously described. It will be noted, as viewed in FIGURE 2, that the rotational movement imparted to the shafts 56 will effect a rotational movement of the drive rollers 58 which, in turn, effect a movement of the belts 60 in a direction such that the operative carton side engaging flights contacting the inner peripheries of the idler rollers 36 will move in a direction from the receiving end of the frame assembly to the discharge end thereof. When the electromagnetic clutch-brake unit 100 is deactuated, the rotative power of the motor 98 to the drive shafts 56 is immediately discontinued and rotary movement of the shafts 56 is positively brought to a stop by the braking action of the unit 100. The operation of the unit 100 therefore controls the movement of the cartons through the machine 10, by means of the belts 60.

When dealing with cartons of varying widths, it is not always possible to deliver the cartons to the machine in properly oriented relation. To this end, each belt assembly 14 is provided with a carton orienting mechanism 119 adjacent the receiving end thereof. The carton orienting mechanisms cooperate together, when an improperly oriented carton is fed to the machine, to move such a carton into proper oriented relation prior to its actual movement through the machine by the belt assemblies. Each carton orienting mechanism includes an elongated carton side engaging member 120 disposed adjacent the receiving end of the associated belt 60 at a position between the lower edge thereof and the upper periphery of the adjacent carton supporting rollers 32. As best shown in FIGURES 7 and 8, each member 120 is mounted for limited transverse movement from a position spaced inwardly of the associated belt 60 to a position in alignment therewith or slightly outwardly thereof. Any suitable means may be provided for accomplishing this movement and, as shown, each carton engaging member 120 is of an angle iron construction having one flange thereof extending generally horizontally and rigidly secured to the adjacent ends of a pair of transversely spaced generally S-shaped mounting arms 121. The mounting arms 121 are rigidly secured to a shaft 122 pivotally carried in a suitable mounting bracket assembly 123, fixed to the outer surface of the associated belt assembly 34 of the associated belt assembly 14. Each mounting arm 121 includes a laterally outwardly extending portion having the upper end of a vertically extending coil spring 124 connected therewith, the lower end of which is anchored to the associated mounting bracket assembly 123.

The springs 124 associated with each carton orienting mechanism 119 are of a strength sufficient to resiliently urge the associated carton engaging member 120 inwardly of the associated belt 60 and to permit yieldingly outward movement of the associated carton engaging member 120 when engaged by cartons of the order of the heaviest which would be accommodated by the machine.

The strength of the springs 124 associated with each carton engaging emmber 120 is considerably less than the inward force applied to the associated belt assembly by the piston and cylinder unit 68. Consequently, the carton engaging members 120 operate during the inward movement of the belt assemblies 14 to initially engage a non-oriented carton fed to the machine between the belt assemblies. Where the carton is relatively small and light, the carton engaging members will serve to move the carton into proper oriented position prior to the engagement of the belts 60 therewith. Where relatively large and heavy cartons are encountered, the operation of the carton engaging members may be such that rather than effecting movement of the carton, the carton engaging members themselves will have a relative movement with respect to the belts. Under these circumstances, the belt in engagement with the leading corner of the carton will tend to remain in gripping contact with the carton while the opposite carton engaging member 120 will relieve the frictional contact of the opposite belt with the trailing corner of the carton sufficient to permit some relative movement between the trailing corner of the carton and the associated belt 60, so that the carton will tend to be pulled into proper oriented position as a result of its gripping engagement with the opposite belt at the leading corner thereof.

It will also be noted, as best shown in FIGURES 1 and 3, that a wing-like member 125 is carried by each belt assembly 14 at a position spaced slightly from the receiving end thereof. These members are provided for the purpose of insuring that the side flaps of any cartons fed to the machine, which may be inadvertently bent outwardly, will be moved into a vertical position prior to engagement with the flap folding mechanism 16 so as to insure proper folding thereby.

FLAP FOLDING MECHANISM

Referring now more particularly to FIGURES 1 and 7–11, the flap folding mechanism 16 is mounted above the horizontal rollers 32 of the frame assembly at a position adjacent the receiving end portion thereof for movement into a plurality of adjusted positions to accommodate a plurality of height size ranges of cartons. For example, the arrangement as shown will accommodate height variation within a range of nine inches. The accommodate range may be adjusted from 6"–15" to 15"–24" at 1¼" intervals.

This adjustment, as shown, is accomplished by a tubular support member 126 fixedly secured to the frame assembly adjacent one side thereof near the carton receiving end thereof. As best shown in FIGURE 2, the support member 126 is of hollow rectangular configuration in cross-section and is adapted to slidably receive thereover a sleeve 128 of a corresponding cross-sectional configuration and appropriate size. Rigidly secured to the sleeve 128 and extending laterally outwardly therefrom is a horizontal support member 130. The sleeve 128 and support member 130 carried thereby are adapted to be fixedly secured to the upright support member 126, by any suitable means, such as a pin 132 extending through an appropriate aperture in the sleeve and selectively into any one of a plurality of vertically spaced openings 134 formed in the vertical support member 126.

In order to aid in the vertical movement of the sleeve 128 with respect to support member 126 into different positions of adjustment, a counterbalancing weight 136 is mounted within the support member 126 for vertical movement therein, the counterbalancing weight 136 being connected to one end of a rope or cable 138. The cable extends upwardly from the weight 136 and is trained about a pulley 140, carried by the support member 126 adjacent the upper end, and has its opposite end fixedly secured to the support member 130, as indicated at 142.

Fixedly secured to the free end of the support member 130 is a longitudinally extending mounting bracket 144 which is preferably of inverted U-shaped configuration in cross-section, such as would be provided by a channel beam. Carried by the mounting bracket at the end thereof adjacent the receiving end of the frame assembly 12 is an end flap folding belt assembly, generally indicated at 146. The belt assembly 146 is carried by the mounting bracket 144 for movement between a normal inoperative lowermost position (FIGURE 10) extending downwardly and in the direction of carton movement and an operative raised position (FIGURE 11) also extending downwardly and in the direction of carton movement but at a lesser angle with respect to the horizontal.

The belt assembly 146 includes a shaft 148 journalled within the mounting bracket 144 for rotational movement about a transverse axis.

Pivotally secured to the shaft 148 is one end of an elongated frame element 150 which is preferably of channel configuration in cross-section, the legs of the channel extending in a direction downwardly and opposed to the direction of the carton movement. The opposite end of the frame element 150 rotatably receives an idler shaft 152, the axis of which is parallel with the axis of shaft 148. Fixedly secured to the shafts 148 and 152 is a pair of pulleys 154 and 156 about which is trained and endless belt 158. While a single belt is shown, two or more belts may be used if desired. The belt may be of any suitable construction and the periphery thereof may be provided with a series of spaced transversely extending grooves. The belt 158 thus presents an operative flight which extends downwardly and in the direction of carton movement when the assembly 146 is disposed in its lowermost position, as shown in FIGURE 10, so as to be engaged by the leading end flap of a carton being moved through the machine by the belt assemblies 14. It will also be noted that the operative flight of the belt assembly 146 is positioned to engage the upper leading edge of the carton so that subsequent movement of the carton with the upper leading edge in engagement therewith will serve to pivot the belt assembly from its normal lowermost position to a raised position wherein the lower pulley 156 will ride over the leading end flap and retain the latter in closed relation, as shown in FIGURE 11.

Means is provided for driving the belt assembly 146 after it has folded the leading end flap into closed relation so that the operative flight of belt 158 will be moved downwardly and in the direction of carton movement at a speed greater than the movement of the carton so that when the upper edge of the trailing end flap engages the operative flight of the belt, the latter will serve to move the trailing end flap into closed relation. To this end, there is provided an electric motor 160 mounted on the support member 130 having its output shaft drivingly connected to the shaft 148, as by belt and pulley assembly 162.

The flap folding mechanism 16, in addition to the end flap folding belt assembly 146, also includes a rigid structure, generally indicated at 164, mounted for vertical translational movement with the lower pulley 156 of the belt assembly for retaining the end flaps in their closed position during the subsequent movement of the carton and for effecting the movement of the side flaps of the carton into closed relation. As best shown in FIGURES 9–11, the structure 164 includes a longitudinally extending end flap engaging runner member 166, the end of the runner member 166 adjacent the receiving end of the frame assembly being rotatably connected with the shaft 152 for swinging movement therewith. A parallel link 168 is pivotally connected between the opposite end portion of the member 166 and mounting bracket 144, as indicated at 170 and 172 respectively, for stabilizing the movement of the runner member with the lower pulley 156 of the belt assembly 146 to a vertical translational movement.

For the purpose of controlling the vertical translational movement of the rigid structure 164 and the pivotal movement of the belt assembly 146, a counterbalancing spring 174 is connected between the upper central portion of the parallel link 168, as indicated at 176, and the adjacent end of the mounting bracket 144, as indicated at 178. In addition, a pneumatic piston and cylinder unit 180 is provided, the cylinder thereof being fixedly mounted on the mounting bracket and the piston rod being articulately connected with the center portion of the frame element 150 of the belt assembly 146, as by a connecting link 182.

Fixedly secured to the end of the runner member 166 adjacent the discharge end of the frame assembly 12 is one end of a pair of rigid side flap folding members 184. As best shown in FIGURES 9–11, the side flap folding members 184 extend outwardly and upwardly from the runner member 166 and have their outer ends interconnected, as by a cross brace 186. In order to provide further strength for the side flap folding members 184, a strut 188 is connected to the central portion of the cross brace 186, extends through the parallel link 168 and is connected to the runner member 166 adjacent the pulley 156, as indicated at 190.

Means is provided at the end of the runner member 166 adjacent the discharge end of the frame assembly for engaging the side flaps after they have been folded into closed relation by the side flap folding members 184 and for retaining the side flaps in closed relation, the means being extendible and retractable in response to the vertical position of the rigid structure 164 so as to compensate for the longitudinal component of movement of the latter. As shown, there is provided a tubular housing 192 disposed in alignment with the longitudinal axis of the machine and extending parallel with side flap folding members 184. Mounted within the housing for sliding movement with respect thereto along its axis is a slide member 194, the outer end of which has fixed thereto a side flap engaging element 196. The member 194 is biased into an outward limiting position by any suitable means, such as a coil spring 198 disposed within the housing 192 in surrounding relation to the member 194 and with the ends thereof acting against the end of the housing and a shoulder formed on the member 194. The member 194 is retracted against the action of spring 198 in response to the upward movement of the rigid structure 164, by any suitable means, such as a cable or flexible element 200 connected at one end to the extremity of the member 194 extending outwardly of the housing 192. The cable 200 is trained about a pulley 202 carried by the central portion of the cross brace 186 and has its opposite end fixedly secured to the adjacent portion of the parallel link 168, as indicated at 204.

STAPLING MECHANISM

The top stapling mechanism 18, like the flap folding mechanism 16, is mounted over the horizontal rollers 32 of the frame assembly between the flap folding mechanism 16 and the discharge end of the frame assembly for movement into a plurality of adjusted positions to accommodate a plurality of vertical size ranges of cartons. While this mounting may be accomplished by any suitable arrangement, preferably an assembly similar to that previously described in connection with the flap folding mechanism is employed. Thus, as best shown in FIGURES 4 and 12, the mounting assembly includes a support member 206, a sleeve 208, a support member 210, a locking pin 212, adjusting apertures 214, counterbalancing weight 216, cable 218, cable pulley 220, and cable anchor 222.

The top stapling mechanism 18 includes a power operated stapling head, generally indicated at 224, carried by the mounting member 210 for movement from a normal uppermost position downwardly to a position of engagement with the top of the carton.

While the stapling head 224 may be of any conventional design, a preferred embodiment is disclosed in commonly assigned Kufel Patent No. 3,064,626, dated Nov. 20, 1962, utilizing a staple feed mechanism as disclosed in commonly assigned Kufel Patent No. 3,029,436, dated Apr. 17, 1962, in conjunction with a staple package such as disclosed in commonly assigned Peterssen Patent No. 2,943,436, dated July 5, 1960. The term "staple" as herein utilized comprehends within its meaning other types of fasteners, particularly those fasteners which are applied by wire stitching machines.

As disclosed in Kufel Patent No. 3,064,626, the stapling head 224 is of the type including a pair of clincher arms adapted to be moved into piercing relation to the carton to provide anvil means against which the staples are clinched. The clincher arms and staple driving element are moved through a driving stroke and a return stroke by a piston and cylinder unit, schematically illustrated in FIGURE 13 and designated by the numeral 226. In addition, the stapling head 224 preferably includes a switch 228 therein which is normally held into an open position by the presence of a supply of staples in the head and moved into a normally biased closed position when the supply of staples is reduced to the last eight or nine.

In accordance with the principles of the present invention, the top stapling head 224 is mounted on a mounting bracket 230 fixedly secured to the end of the support member 210 for vertical reciprocatory motion, by means of a piston and cylinder unit, generally indicated at 232 of conventional construction. As best shown in FIGURE 12, the cylinder of the unit 232 if fixedly secured to the mounting bracket 230 and the end of the piston rod of the unit 232 is fixedly secured to the stapling head 224. An L-shaped guide bar 234 is likewise fixed to the stapling head and extends upwardly therefrom for engagement within a slot 236 in the mounting bracket to aid in guiding the stapling head during its vertical reciprocatory movement.

The bottom stapling mechanism 20 comprises a stapling head 238 preferably of the same construction as the top stapling head 224 including piston and cylinder unit 240 for moving the clincher arms and the staple driving element through driving and return strokes and switch 242 for sensing the absence of a supply of staples therefor. The bottom stapling head is fixedly carried by the frame assembly 12 and for this purpose, a peripheral frame section 244 is provided within which the head is mounted, the peripheral frame section 244 being rigidly supported by the frame assembly and apertured to receive the shaft ends of shortened rollers 32 disposed in the area of the peripheral frame section, as best shown in FIGURE 2.

PNEUMATIC CIRCUIT

Figure 13:
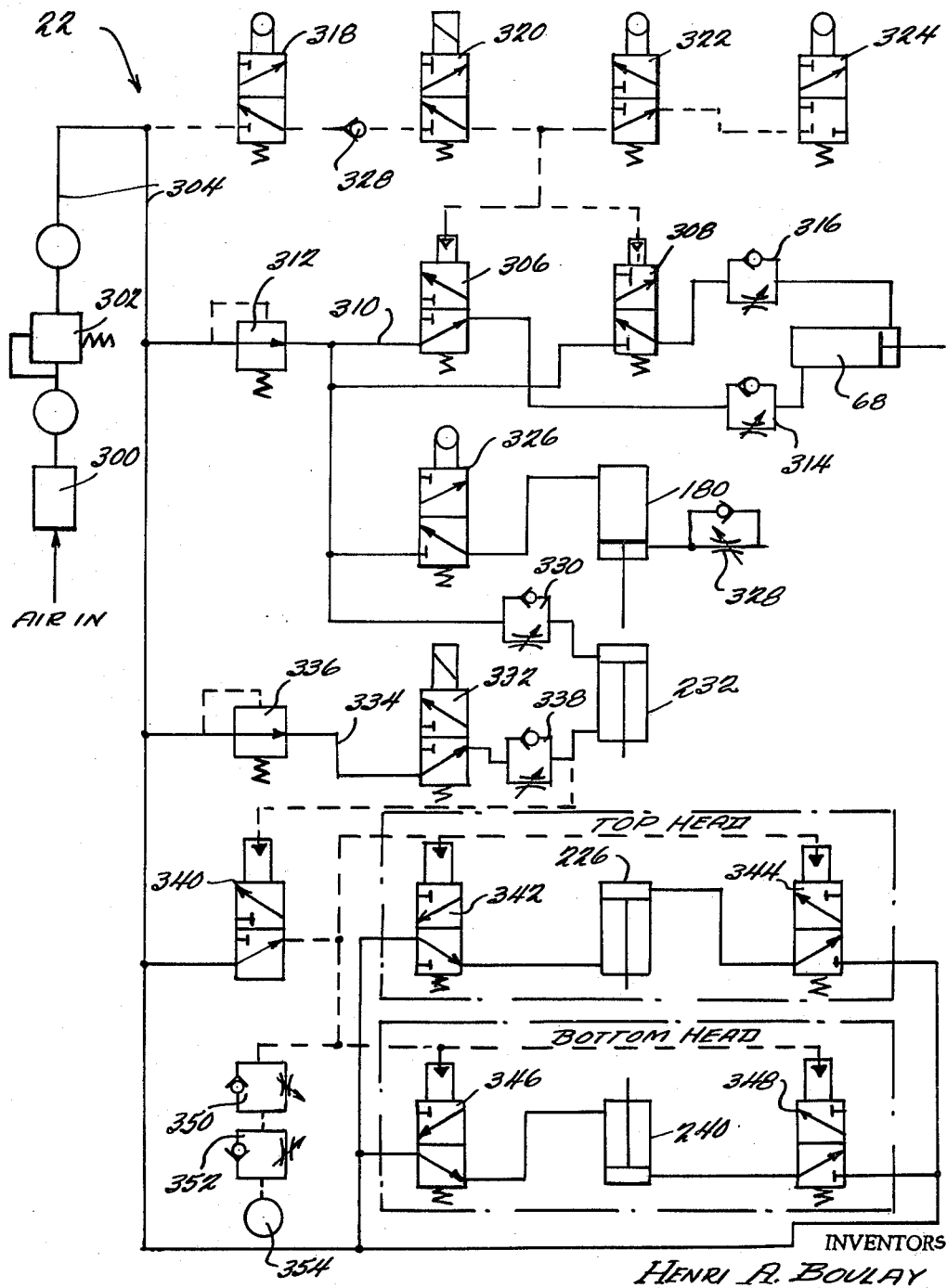
FIGURE 13 is a schematic view illustrating the pneumatic circuit of the machine.

Referring now more particularly to FIGURE 13, the pneumatic circuit 22 includes a source of air under pressure 300 connected with a pressure regulating valve 302 of the type adapted to be adjusted to establish any desired operating pressure in a main high pressure line 304, as, for example, 80 p.s.i. Actuation of the piston and cylinder unit 68 which effects the transverse movement of the belt assemblies 14 toward and away from each other is controlled by a pair of pilot pressure operated three-way valves 306 and 308.

Valves 306 and 308 are connected in parallel with a low pressure line 310 which receives pressure from the main high pressure line 304 through a pressure regulating valve 312 which serves to establish the low pressure within the line 310, as, for example, 12 p.s.i. The valve 306 controls communication of the low pressure line 310 with the piston and cylinder unit 68 on the side thereof which operates to open the belt assemblies or move the belt assemblies away from each other. Preferably, a flow control valve 314 is connected between the valve 306 and the piston and cylinder unit 68 for permitting free flow of air from the valve to the unit and controlled flow of air from the unit to the valve.

Valve 306, in its normal position, communicates the low pressure line 310 with the associated side of the piston and cylinder unit 68 and when actuated by pilot pressure serves to close communication with low pressure line 310 and to discharge the air in the associated side of the unit to atmosphere. The valve 308 controls the communication of the low pressure line 310 with the opposite side of the piston and cylinder unit which moves the latter in a direction to close the belt assemblies or move them toward each other into engagement with the carton. Valve 308, in its normal position, communicates the opposite side of the piston and cylinder unit to atmosphere, and when actuated by pilot pressure, communicates the piston and cylinder unit 68 with the low pressure line 310. Preferably, a flow regulating valve 316 is connected between the valve 308 and the unit 68 so as to permit free flow of air from the valve to the unit and controlled flow of air from the unit to the valve.

The valve 322 is a cam trip operated valve which normally communicates pilot pressure from the valve 320 to the valve 324. The valve 322 is mounted on the frame assembly in the central portion thereof adjacent the discharge end in a position to be engaged by the leading lower edge of a carton moving through the machine by the belt assemblies 14, as shown in FIGURES 22–23. When the valve 322 is actuated by engagement of a carton, it is moved into a position closing communication of pilot pressure with the valve 324 and exhausting the valve 324 with the atmosphere.

Valve 324 is also a cam trip operated valve which, in its normal position, is closed to receive pilot pressure from the valve 322. The valve 324 is carried by the frame assembly 12 in spaced longitudinal relation to the valve 322 between the latter and the discharge end of the frame assembly and in a position to be engaged by the leading lower end of a carton moving through the machine by the conveyor mechanisms 14, as shown in FIGURES 22–23. When the valve 324 is actuated by engagement of a carton therewith, it is moved from a closed position to an open position permitting exhaust of pilot pressure when the valve 322 is closed, as by movement of the trailing carton end therefrom.

Pilot pressure to operate valves 306 and 308 is communicated from the main high pressure line 304 under the control of four valves 318, 320, 322, and 324. Valve 318 is a cam trip operated valve which, in its normal position, closes main line 304 and communicates pilot pressure to atmosphere. The valve 318 is carried by the frame assembly at a position adjacent the central portion of the carton receiving end thereof so as to be engaged by the leading lower end of the carton as the latter is fed to the receiving end of the machine. When the cam trip of the valve 318 is actuated by engagement of the carton therewith, the valve is moved into an open position communicating the high pressure line with the valve 320 through a check valve 328.

Valve 320 is a solenoid operated valve which, in its normal position, closes communication with the valve 328 and exhausts pilots pressure to atmosphere, and when energized, serves to communicate pilot pressure from the check valve 328 in parallel with the pilot pressure valves 306 and 308 and with the valve 322.

The piston and cylinder unit 180 of the flap folding mechanism 16 is operable to stabilize the engagement of the rigid structure 164 of the flap folding mechanism 16 with the carton and to control the movement of the rigid structure 164 from its carton engaging position into its lowermost position when the carton engaged thereby passes thereunder. Thus, the piston and cylinder unit 180 is adapted to be communicated with the low pressure line 310 under the control of a valve 326.

The valve 326 is a cam trip operated valve which, in its normal position, closes communication with the low pressure line 310 and exhausts the upper end of the unit 180 to atmosphere. The valve 326 is carried by the frame assembly 12 in inward longitudinally spaced relation from the valve 318 in a position to be actuated by the leading lower end of a carton which has been moved by the conveying mechanisms 14 partially through the flap folding mechanism 16 (FIGURES 18–19). When the valve 326 is actuated by the engagement of a carton therewith, it is moved into a position communicating the low pressure line 310 with the upper end of the piston and cylinder unit 180 so as to apply a downward pressure on the rigid structure 164 maintaining the same firmly in engagement with the top of the carton moving therebelow. A flow control valve 328 is connected with the lower end of the piston and cylinder unit 180 which serves to meter the exhaust of air from the lower end of the piston and cylinder unit as when the rigid structure moves downwardly in response to the passage of the cartoon thereunder. The valve 328 thus serves to control this downward movement and prevent undue shocks to the flap folding mechanism 16 which might result in the event that the flap folding mechanism were permitted to move into its lowermost position in an uncontrolled manner.

The low pressure line 310 communicates through a flow control valve 330 directly with the upper end of the piston and cylinder unit 232 so that the lower pressure is at all times tending to move the top stapling head 224 downwardly. Since low pressure fluid is at all times communicated with the upper end of the piston and cylinder unit 232, movement of the latter is accomplished either by exhausting the lower end of the piston and cylinder unit or by communicating high pressure thereto under the control of a valve 332. The valve 332 receives high pressure from a line 334 which, in turn, receives pressure from the main pressure line 304 through a pressure regulating valve 336 which serves to establish a predetermined pressure in the line 334, as, for example, 60 p.s.i.

Valve 332 is a solenoid operated valve which, in its normal position serves to communicate the pressure line 334 with the lower end of the piston and cylinder unit 232 through a flow regulating valve 338. The flow regulating valve permits free flow of fluid from the valve 332 to the unit 232 and restricts flow from the unit to the valve. When the valve 332 is energized, it is moved into a position closing communication with the pressure line 334 and communicates the lower end of the piston and cylinder unit 232 to the atmosphere through the flow control valve 338.

The pressure within the line between the flow control valve 338 and the piston and cylinder unit 232 is utilized as pilot pressure to actuate a valve 340 which controls the operation of the piston and cylinder units 226 and 240 of the top and bottom stapling heads 224 and 238 respectively. Valve 340, in its normal position, serves to communicate the high pressure line 304 as pilot pressure to a pair of valves 342 and 344 controlling the piston and cylinder unit 226 of the top stapling head 224 and a pair of valves 346 and 348 controlling the piston and cylinder unit 240 of the bottom stapling head 238. When the valve 340 is actuated by pilot pressure, it is moved into a position closing communication with the high pressure line 304 and communicating pilot pressure for the valves 342, 344, 346 and 348 to atmosphere.

Valves 342 and 346 are normally open so as to communicate pressure in the high pressure line 304 with the piston and cylinder units 226 and 240 respectively, to maintain the top and bottom stapling heads respectively in their retracted positions. Likewise, valves 344 and 348, in their normal position, communicate the opposite sides of the piston and cylinder units 226 and 240 with atmosphere and close communication with the high pressure line 304. When pilot pressure is communicated with these valves by the valve 340, valves 342 and 346 are moved into a position closing communication with high pressure line 304 and exhaust the associated sides of the piston and cylinder units 226 and 240 to atmosphere while valves 344 and 348 are moved into a position communicating high pressure line 304 with the opposite sides of the piston and cylinder units 226 and 240 to thus move the top and bottom stapling heads through a staple driving stroke. Since the communication of pilot pressure to the valves 342, 344, 346 and 348 initiate the staple driving stroke of the top and bottom stapling heads, by metering the pilot pressure communicated with these valves through a pair of opposed series connected flow control valves 350 and 352 to a pressure operated switch 354, the pressure operated switch 354 can be utilized to initiate the return stroke of the stapling heads. It will be noted that the flow control valve 350 permits free flow of pressure to the pressure operated switch 354 but restricts the flow of pressure therefrom, while flow control valve 352 restricts the flow of pilot pressure to the pressure operated switch 354 but permits free flow therefrom.

ELECTRICAL CIRCUIT

Figure 14:
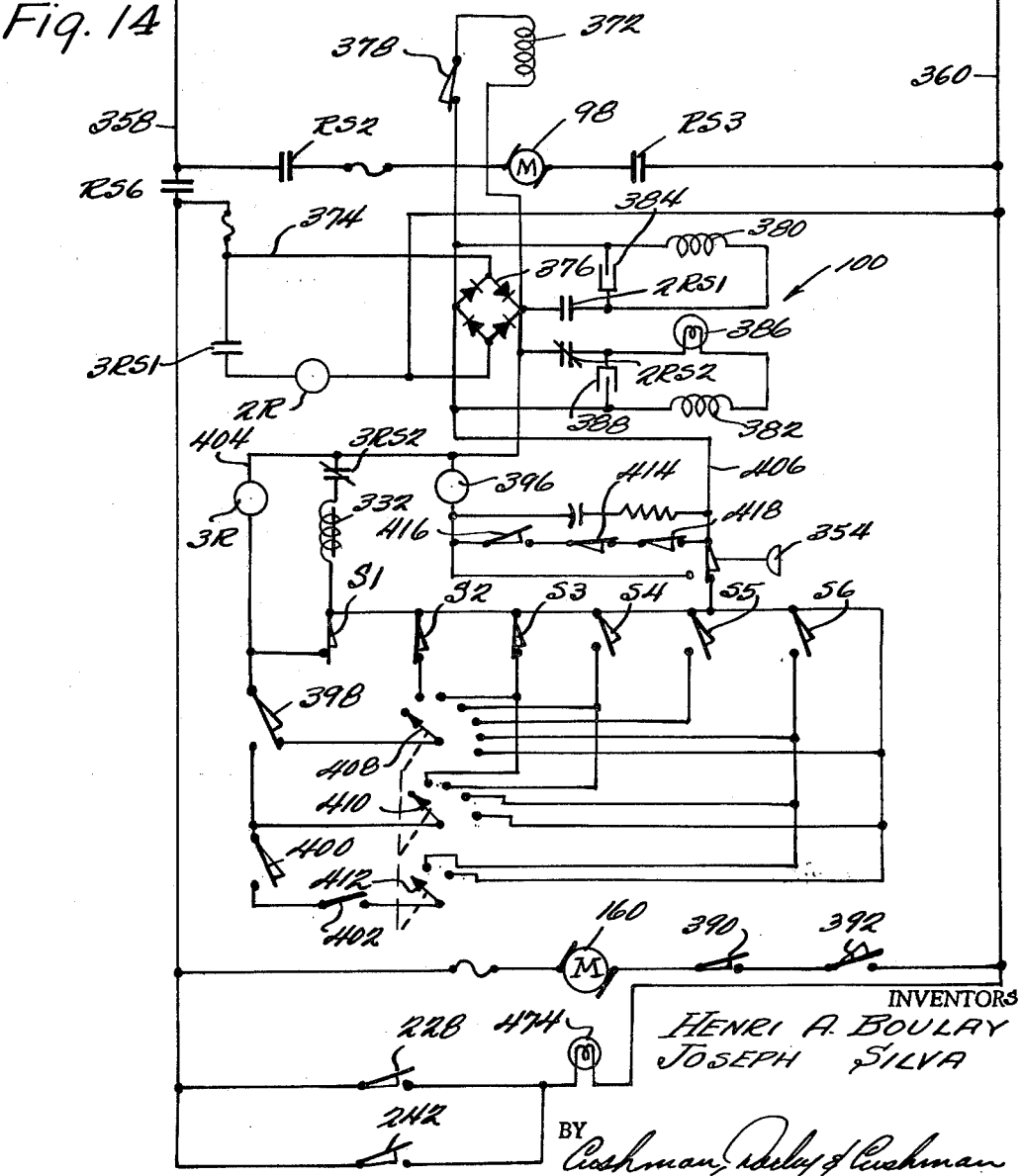
FIGURE 14 is a schematic view illustrating the electrical circuit of the machine.

Referring now more particularly to FIGURE 14, electric circuit 24 includes a source of alternating current, indicated at 356, which may be, for example, 115 volts. The source 356 is connected with a pair of main lines 358 and 360 in series with a main control switch 362. The motor 98 which drives the belt assemblies 14 is energized under the control of a relay R, the coil of which is connected across the main lines 358 and 360 in series with a pair of stop buttons 364 and 366 and a start button 368. The relay R includes six sets of normally open switch contacts, RS1 through RS6. RS1 is connected across the normally open contacts of the start switch 368 and serves as a holding circuit to maintain the coil of relay R energized after the start button 368 is released. Switch contacts RS2 and RS3 are connected in series with the motor 98 across the main lines 358 and 360 so as to energize the motor when the relay R is energized. Switch contacts RS4 and RS5 are connected in series with a motor 370 which serves to drive the conveyor belt of an in-feed conveyer 371 (FIGURES 1, 2 and 18) through an electromagnetic clutch 372. Switch contact RS6 connects the main line 358 with a line 374 so as to control the remaining elements of the circuit. A bridge rectifier 376 is connected in series across the lines 374 and 360, the bridge being operable to convert the alternating current of the source 356 to direct current and thus provide a source of direct current.

This source of DC current is utilized to energize the coil of the electromagnetic clutch 372 which serves to drivingly connect the motor 370 to the belt of the in-feed conveyor 371. The coil of the clutch is connected in series with a switch 378 which is carried by the frame assembly 12 adjacent one side thereof in a position to be actuated by engagement of a portion of the adjacent conveyor mechanism 14 when the latter is moved into its outermost limiting position (FIGURES 18–23).

The source of direct current is also utilized to control the electromagnetic clutch-brake unit 100. FIGURE 14 schematically illustrates separate energizing coils 380 and 382 for the clutch and brake respectively of the unit 100. The energization of the coils 380 and 382 of the electromagnetic clutch-brake unit 100 is under the control of a relay 2R which, in turn, is controlled by a relay 3R. The relay 2R includes a normally open switch contact 2RS1 which is connected in series with the clutch coil 380. Preferably, a capacitor 384 is shunted across the clutch coil 380. The relay 2R also includes a normally closed switch contact 2RS2 which is connected in series with the brake coil 382 and a resistor in the form of a 100 watt lamp 386. As before, a capacitor 388 is shunted across the brake coil 382 and resistor lamp 386.

The coil of the relay 2R is connected across the lines 374 and 360 in series with a normally open switch contact 3RS1 of the relay 3R so as to be energized in response to the energization of the coil of the relay 3R. It can be seen that when the relay 2R is energized, the electromagnetic clutch-brake unit 100 is actuated to drive the belts 60 of the belt assemblies 14 due to the deenergization of the brake coil 382 and the energization of the clutch coil 380. Conversely, when the relay 2R is deenergized, the movement of the belts 60 is stopped by the electromagnetic clutch-brake unit 100 through the deenergization of clutch coil 380 and energization of the brake coil 382.

The electric motor 160 which drives the end flap folding belt 158 of the flap folding mechanism 16 is connected across the main lines 374 and 360 in series with a pair of switches 390 and 392. As best shown in FIG-URES 10 and 11, the switch 390 is of the normally closed type and is carried by the mounting bracket 144 of the flap folding mechanism 16 in a position to be opened by an arm 394, fixed to the upper end of the link 164 and extending laterally therefrom, when the rigid structure 164 of the flap folding mechanism is disposed in its lowermost position as shown in FIGURE 10. The switch 390 will thus be moved into its normally closed position in response to the initial movement of the rigid structure 164 upwardly out of its normal lowermost position. The switch 392 is a normally open switch and is carried by the frame 34 of one of the belt assemblies 14 in a position to be engaged by the adjacent leading vertical corner of a carton during its movement through the machine by the conveyor mechanisms 14.

As best shown in FIGURE 10, the operative flight of the end flap folding belt 158 when disposed in its lowermost position is approximately 33° with respect to the horizontal. Insofar as actuation of the motor 160 is concerned, it is of importance that the belt be driven only when the free edge of the trailing or rear end flap of the carton engages the operative flight thereof so as to effect inward movement of the trailing end flap. If the belt were driven during the engagement of the free edge of the leading end flap therewith, the leading end flap would be folded outwardly rather than inwardly. The angle of inclination which the operative flight of the belt 158 assumes after it has been moved upwardly from its lowermost position to engage the top of the carton will vary in accordance with the height of the carton fed to the machine. This angle will decrease as the height of the cartons approaches the upper limit of the height range at which the machine is adjusted.

It is desirable that the leading upper edge of the box will have passed under the lower pulley 156 of the belt assembly prior to the energization of the driving motor 160 since if the motor is energized while the belt is in engagement with the upper edge of the carton the driving movement of the belt will tend to abraid the surface of the carton. This condition is readily achieved with respect to cartons whose length is substantally greater than the width thereof. Where square cartons are encountered the operative flight of the belt 158 will engage the free edge of the trailing flap when the operative flight of the belt is still in engagement with the upper leading edge of the carton and the belt assembly has been moved upwardly into a position where in the operative flight has an angle of approximately 26½°. When these conditions are encountered, the drive motor 160 must be energized, otherwise during subsequent movement of the carton the trailing end flap will be folded outwardly and the belt will be ineffective to effect the inward folding movement thereof if this outward folding movement takes place to too great an extent.

The switch 392 is provided to insure that the drive motor 160 will be energized at a time before such situation is encountered. This switch is positioned on the frame member 34 of one of the belt assemblies 14 in longitudinally spaced relation of approximately 4" from the axis of the lower pulley 156, as shown in FIGURE 10, measured in a direction opposite to the direction of carton travel. Thus, with the provision of switches 390 and 392, both will always be closed at a time sufficient to energize the motor and drive the belt prior to the engagement of the upper free edge of the trailing end flap with the operative flight of the belt.

While the pivotal mounting of the belt assembly 146 as described above and shown in the drawings is preferred, it will be understood that other arrangements may be utilized for mounting both the belt assembly 146 and the rigid structure 164 for movement from its lowermost position upwardly to a vertical position accommodating the height of the carton. For example, the frame 150 of the belt assembly 146 could be made as a rigid part of the rigid structure 164 and a second parallel link provided in lieu of the articulated connection of the belt assembly between the mounting bracket and the member 166. With this arrangement, the belt assembly would be vertically movable but its angle of inclination would not change in response to vertical movement so that an optimum angle approaching 26½° for the operative flight could be utilized. Under these circumstances, a single motor engaging switch could be carried by the rigid structure at a position to be engaged by the upper leading edge of the carton as it passes beneath the lower pulley of the belt assembly. Of course, with this arrangement, a floating drive for the belt assembly such as that provided for the belts of the belt assemblies 14 might be used between the driving motor 160 and the belt assembly 146.

As previously described the energization of the relay 3R will, in turn, effect the energization of the relay 2R which, in turn, will drive the belts 60 of the belt assemblies 14. Since the movement of the carton is stopped to effect the stapling operation, the position of the carton at which it is stopped will determine the position at which the staples are driven into the carton. As previously described, an important aspect of the present invention resides in varying the positions at which the carton is stopped to thereby vary the position at which the staples are driven into the carton in accordance with the width size of the carton fed to the machine.

The position at which the carton is stopped is determined by a circuit including the coil of relay 3R, six position switches S1, S2, S3, S4, S5, S6, a stepping switch 396, a pair of automatic selector switches 398 and 400, and a manual selector switch 402. As shown in FIGURE 14, these elements are included in a DC circuit which includes two main leads 404 and 406 connected to the DC source provided by the bridge 376.

The position switches S1–S3 are normally closed switches adapted to be opened by engagement of the leading end of the carton therewith. The switches S4–S6 are normally open switches which are closed by the engagement of the leading end of the carton therewith and are opened in response to the passage of the trailing end of the carton therefrom.

The coil of the relay 3R is connected across the main leads 404 and 406 in series with position switch S1 and the pressure sensitive switch 354 described above in connection with the pneumatic circuit 22 of FIGURE 13. As best shown in FIGURES 18–23, switch S1 is fixedly carried by the frame member 34 of one of the conveyor mechanisms 14 in a position to be opened by the leading edge of the carton when the carton has reached a position of movement in which the leading end is disposed approximately 1" or slightly less from the axis of the drive tracks of the stapling heads. Thus, fixed position switch S1 determines the position at which the carton will be stopped by the conveying mechanisms 14 which, in turn, determines the position at which the staples are driven into the carton. Thus, as described above, the first staples will be driven into the cartons at a position within 1" of the leading end thereof.

Relay 3R includes a normally closed switch contact 3RS2 which is connected across the main leads 404 and 406 in series with the pressure actuated switch 354 and the coil of the solenoid actuated valve 332. As previously described in connection with the pneumatic circuit 22, solenoid valve 332 controls the movement of the position and cylinder unit 232 of the top stapling mechanism 18. Since switch contact 3RS2 is open when the coil of relay 3R is energized, switch contacts 3RS2 will move into their normally closed position to energize the solenoid valve 332 in conjunction with stoppage of the belt assemblies 14 when switch S1 is open.

The stepping switch 396 may be of any conventional construction as, for example, a type 44 rotary stepping switch such as produced by the Automatic Electric Company. A switch of this type includes three switch levels including three simultaneously movable rotary step switch arms 408, 410, and 412, an interrupter switch 414 and a zero position switch 416. The coil of the stepping switch 396 is connected across the main leads 404 and 406 in series with the interrupter switch 414, the zero switch 416, and a reset switch 418. The reset switch 418 is a normally open switch which is carried by the frame assembly adjacent one side thereof in a position to be closed by engagement of a fixed portion of the structure of the adjacent conveying mechanism 14 when the latter is moved into its outermost limiting position, as shown in FIGURES 18-23. Thus, when the reset switch 418 is closed, interrupter switch 414 is operable to continuously sequence the stepping switch 396 by intermittent energization of the coil until the zero or home position of the stepping switch is reached at which time zero switch 416 will open.

The switch arms 408, 410, and 412 are connected with the lead 404 in series with the coil of relay 3R so as to be controlled by the switches 398 and 400. Switches 398 and 400 are carried by the frame assembly 12 in positions to be actuated at predetermined times during the inward movement of the conveyor mechanisms 14 from their outermost position, as shown in FIGURE 3. For example, switch 398, which normally connects the first level switch arm 408 with the lead 404 is moved into a position connecting the second level switch arm 410 with the lead 404 and disconnecting the first level switch arm 408 therefrom when the operative flight of belts 60 reaches a position 7" from the longitudinal axis of the machine and remains in such position so long as the belt assemblies 14 are at this position or inwardly thereof. The switch 400 is a normally open switch which is closed when the operative flight of belts 60 reaches a position 4" from the longitudinal axis of the machine and remains closed so long as the belt assemblies 14 are at such position or inwardly thereof. Selector switch 402 is a manually operable open and close switch which is maintained closed during normal automatic operation. This switch is connected between switch 400 and the third level switch arm 412 of the stepping switch 396.

In the schematic circuitry shown in FIGURE 14, none of the switch arms are connected to complete a circuit therethrough when the stepping switch 396 is in its zero or home position. The first level switch arm is wired to complete a series circuit with the pressure responsive switch 354 to the lead 406 in the first six steps of the stepping switch, the first five of which are in series with the switches S2-S6, respectively, and the last of which bypasses all of the switches S. The second level switch arm is wired to complete a series circuit with the pressure responsive switch 354 to the lead 406 in the first four steps of the stepping switch, the first three of which are in series with the switches S3, S4, and S6, respectively, and the last of which bypasses all of the switches S. The third level switch arm is wired to complete a series circuit with the pressure responsive switch 354 to the lead 406 in the first two steps of the stepping switch, the first of which is in series with the switch S6, and the last of which bypasses all of the switches S.

The coil 396 in addition to the circuit through switches 414, 416, 418 is included in a parallel circuit across the leads 404 and 406 in series with the pressure responsive switch 354 which is completed when the switch 354 is actuated. Switch 354 is normally actuated a predetermined time after the completion of the staple driving operation which constitutes, in effect, the end of a stapling cycle. A stapling cycle includes stopping the movement of the carton, moving the top stapling head 224 downwardly into engagement with the top of the carton, driving the staples, moving the top stapling head upwardly, and restarting the movement of the carton. Thus, the actuation of pressure responsive switch 354 not only serves to deenergize the coil of the relay 3R at the end of this cycle, but to energize the coil of the stepping switch so that the switch arms will be moved to the next step.

In this way, switch 354 signals the end of a stapling cycle by restarting the movement of the carton by the belt assemblies 14 and conditions the circuitry to begin the next stapling cycle. The position at which the carton is stopped to determine the position at which the staples are driven in the next stapling cycle will vary in accordance with the width of the carton carried by the conveying mechanisms 14. Since the conveying mechanisms engage the sides of the carton the position assumed by the operative flights of the belts 60 is a direct function of the width of the machine and consequently the position of the belts when in engagement with the carton are utilized to control the operation of the automatic selector switches 398 and 400 in the manner previously described and the position of the switches S2-S5 in a manner now to be described.

Referring now more particularly to FIGURES 15-17, in the embodiment shown, switches S2 and S3 are mounted in association with one of the belt assemblies 14 and the switches S4 and S5 are associated with the opposite belt assembly 14. As stated above, the position of the switches S2-S5 are varied in accordance with the lateral position of the belt assemblies 14. Since the switches S2 and S3 are adapted to be actuated in response to the engagement of the leading end of the carton therewith, they are mounted for longitudinal movement in a direction opposed to the direction of carton movement in response to the inward movement of the conveyor mechanisms 14. On the other hand, since switches S4 and S5 are adapted to be actuated in response to the movement of the trailing end of the carton therefrom, they are mounted for movement in the direction of carton movement in response to the inward movement of the conveyor mechanisms 14. Switch S6, like switch S1, is fixedly mounted.

Any suitable means may be provided for effecting the above mentioned movements and as shown in FIGURES 15-17 a lazy tong mechanism 420 is provided for each pair of associated switches. Since the lazy tong mechanism 420 for each pair of switches S2 and S3 or S4 and S5 is similar, except for being substantial mirror images of each other, a description of one should suffice to give an understanding of both. In FIGURES 15-17, the lazy tong mechanism 420 associated with the switches S4 and S5 is shown.

The mechanism 420 includes a generally U-shaped frame structure 422 fixedly secured to the inner surface of the frame member 34 of the associated belt assembly 14 in a position between the operative and return flights of the associated belt 60. Extending longitudinally between the legs of the U-shaped frame section 422 is a guide rod 424, upon which is slidably mounted a pair of slide blocks 426 and 428. A lazy tong linkage 430 of conventional construction is connected between the frame section 422 and each of the slide blocks, the connection with the frame including a pivot pin 432 pivotally receiving one end link of the lazy tong linkage 430 and carried by a bracket 434 fixed to the adjacent portion of the frame section 422. The opposite end link of the lazy tong linkage 430 is pivotally connected to the slide block 426, as by a pivot pin 436, and a pivot pin 438 serves to interconnect the intermediate link of the lazy tong linkage 430 with the slide block 428.

The lazy tong linkage 430 acts in the usual way and serves to impart a motion to the slide block 426 which is twice the motion imparted to the slide block 428. Such motion is transmitted to the lazy tong linkage in response to the inward movement of the associated conveyor mechanism 14 by any suitable means. As shown, such means comprises an elongated flexible element 440 which may be in the form of a cable, cord or the like. The flexible element is anchored at one end, as indicated at 442 in FIGURE 15, to the adjacent side of the frame assembly. From the anchor point 442, the flexible element extends transversely inwardly and is trained about a first pulley 444 rotatably supported on the frame section 422 by any suitable means for rotational movement about a longitudinal axis. From the first roller 444, the flexible element is then trained about a second roller or pulley 446 which is supported on the frame section 422 by any suitable means for rotational movement about a transverse axis in a position spaced vertically upwardly from the axis of the pulley 444. The flexible element 440 extends longitudinally from the second pulley 446 and is anchored to the slide block 426, as indicated at 448. From the anchor 448 the flexible element 440 extends longitudinally over a third pulley 450 similar to the pulley 446 and then over a fourth pulley 452 similar to the pulley 444. The opposite end portion of the flexible element extends transversely toward the longitudinal center of the frame assembly and has its extremity suitably anchored therein, as indicated at 454.

The switches S4 and S5 are carried by the slide blocks 426 and 428 respectively in any suitable manner so as to be disposed in the path of movement of the carton by the belt assemblies 14. An exemplary arrangement is illustrated in FIGURE 17 wherein a switch mounting plate 456 is rigidly secured to each slide block 426 and 428. Each mounting plate includes an upper horizontally extending flange 458 to which the associated switch is secured therebelow. Each switch may include a pivoted cam follower roller assembly 460 disposed therebelow, in a position to be pivoted upwardly by a slidable cam 462. Each cam 462 is secured to the upper central portion of a transversely slidable plunger 464 which is resiliently urged transversely inwardly, as by a coil spring 466. The inner end of each plunger 464 is adjustably secured to one end portion of a carton engaging arm 468, the opposite end portion of which extends transversely inwardly beneath the operative flight of the associated belt 60. As best shown in FIGURE 15, the outer extremity of each carton engaging arm 468 is provided with an inclined cam surface 470 which, when engaged by the carton, during its movement by the belt assemblies 14 will be moved transversely outwardly against the action of the spring 466 thus effecting movement of the cam 462 into engagement with the cam follower assembly 460 to thereby effect movement of the associated switch.

In addition to the above, it will be noted that the electrical circuit 24 also includes a power indicator light 472 connected across the main power lines 358 and 360 and a staple exhaust indicator light 474 connected across lines 374 and 360 in series with each of the staple exhaust switches 228 and 242.

DETAILED OPERATION

Operation of the machine 10 of the present invention is commenced by closing the main power switch 362 and pressing the start button 368 which lights power indicator light 472. As shown in FIGURE 14, closing of start button 368 energizes relay R and the coil of the solenoid actuated valve 320. The energization of the relay R closes switch contact RS1 which maintains the coil of the relay R and the coil of the solenoid valve 320 energized when the start button is released. The energization of the coil of the relay R also serves to energize the motor 98 which drives the belt assemblies 14 through the closing of relay switches RS2 and RS3 and to energize the motor 370 which drives the in-feed conveyor 371 through the closing of relay switch contacts RS4 and RS5.

The energization of relay R also serves to close relay switch contact RS6 which conditions the remaining elements of the electric circuitry as follows (1) energizes the diode bridge 376 to establish the source of DC current; (2) energizes the coil of relay 3R opening normally closed switch relay 3RS2 and closing normally open switch contact 3RS1; (3) energizes the coil of relay 2R in response to the closing of switch contact 3RS1 to close normally open switch contact 2RS1 and open normally closed switch contact 2RS2; (4) energizes clutch coil 380 and deenergizes brake coil 382 of the electromagnetic clutch-brake unit 100 in response to the closing and opening of switch contacts 2RS1 and 2RS2 respectively to thereby drivingly connect the motor 98 to the belt assemblies 14.

It will be understood that the coil of relay R and the coil of solenoid valve 320 will remain energized throughout the operation to be described, the stop switches 364 and 366 at each end of the machine providing a safety device by which the entire circuit can be opened under emergency conditions or when it is desired to cease operation. Assuming that the source of fluid pressure 300 is operating, the initial conditions of the machine 10 are as follows: (1) the belt assemblies 14 are disposed in their outermost positions as shown in FIGURE 18, since valve 306 is disposed in its normal position permitting air under pressure to pass into the piston and cylinder unit 68 to extend the same; (2) the flap folding mechanism 16 is disposed in its lowermost position, as shown in FIGURE 10, since valve 326 communicates the upper end of the piston and cylinder unit 180 with the atmosphere; (3) the top stapling head 224 is disposed in its uppermost position since solenoid valve 332 is disposed in its normal position permitting air under pressure to enter the lower end of the piston and cylinder unit 232 which, in turn, closes normally open valve 340.

When the belt assemblies 14 are disposed in their outermost position, normally open switch 418, which operates to reset the stepping switch 396, is closed, and normally open switch 378, which energizes the coil of the electromagnetic clutch 372, is closed. All other switches and valves are disposed in their normal positions.

The energization of the coil of the clutch 372 drivingly connects the motor 370 of the infeed conveyor 371 to the belt assembly thereof to convey an open carton from the in-feed conveyor onto the receive end of the frame assembly 12 of the machine 10, as shown in FIGURE 19. When the leading end of the carton engages valve 318, the latter will be moved into a position to communicate pilot pressure with the valves 306 and 308 to actuate the same. The actuation of valves 306 and 308 causes the cylinder and piston unit 68 to retract to thereby move the belt assemblies 14 from their outermost position inwardly toward the carton. During the initial movement of the belt assemblies 14 away from their outermost position, switch 378 will move into its normally open position deenergizing the coil of the electromagnetic clutch 372 and thus stopping the conveying movement of the in-feed conveyor 371. In addition, the previously closed reset switch 418 will move into its normally open position.

As the belt mechanisms 14 move inwardly, they will contact the sides of the carton resting on the rollers 32 of the frame assembly adjacent the receiving end of the frame assembly as shown in FIGURE 19. In the event that the carton is conveyed to the machine 10 with its longitudinal axis out of alignment with the axis of the longitudinal axis of the machine 10, the engagement of the belts 60 and the operation of the carton orienting mechanisms 119 will serve to properly position the carton so that its longitudinal axis is aligned with the longitudinal axis of the machine. The operation of the orienting mechanisms 119 is described above in connection with the detailed description thereof.

Since the belts 60 are driven during the inward movement of the belt assemblies 14, upon engagement and proper orienting of the carton therewith, the carton will be conveyed by the operative flights of the belts 60 from the receiving end of the frame assembly toward the discharge end thereof. The carton is then continuously moved from its initial position until the leading end thereof engages switch S1. During this movement the flap folding mechanism 16 is operable to sequentially fold the leading end flap, the trailing end flap and the side flaps into closed relation and to maintain the flaps in closed relation. The operation of the flap folding mechanism is set forth above in connection with the detailed description thereof, the closing of switch 392 by engagement of the carton therewith, and the closing of switch 390 by the upward pivotal movement of the belt assembly 146 serving to energize the driving motor 160 to move the belt 158 to effect the closing movement of the trailing end flap and the engagement of the valve 326 by the carton serving to communicate air under pressure to the upper end of the piston and cylinder unit 180 to maintain the flap folding mechanism in closing relation to the flaps. It will also be understood that when the trailing end of the carton leaves the switch 392, driving motor 160 will be de-energized.

The engagement of the leading end of the carton with the switch S1, as shown in FIGURE 20, initiates the stapling cycle which includes stopping the carton at the stapling position, moving the top stapling head downwardly into engagement with the top of the carton, driving the staples into the carton, retracting the top stapling head and restarting the movement of the carton. This cycle is accomplished as follows:

(1) Opening of the switch S1 de-energizes relay 3R to open switch contact 3RS1 and close switch contact 3RS2.

(2) The coil of relay 2R is de-energized in response to the opening of switch contact 3RS1 to open switch contact 2RS1 and close switch contact 2RS2.

(3) Solenoid valve 332 is energized in response to the closing of switch contact 3RS2.

(4) The clutch coil 380 is de-energized and break coil 382 is energized in response to the opening and closing of the switch contacts 2RS1 and 2RS2 respectively to thereby stop the belt assemblies 14 by the elemtromagnetic clutch-brake unit 100.

(5) The lower end of the piston and cylinder unit 232 is exhausted in response to the energization of the solenoid operated valve 332 to thereby permit the top stapling head 224 to move downwardly under the control of flow control valve 338 and the low pressure communicating with the upper end of the piston and cylinder unit 232 to through flow control valve 330.

(6) Valve 340 is deactuated in response to the pressure within the lower end of the piston and cylinder unit 232 reaching a predetermined low pressure resulting from the engagement of the top stapling head 224 with the top of the carton as its movement is arrested thereby, the valve 340 being moved into its normally opened position to communicate pilot pressure to the valves 342, 344, 346 and 348 and to the flow control valve 352.

(7) The fastener driving strokes of the piston and cylinder units 226 and 240 of the top and bottom stapling heads 224 and 238 respectively are initiated in response to the actuation of valves 342, 344, 346 and 348.

(8) Pressure responsive valve 354 is actuated at a predetermined time sufficient to permit completion of the fastener driving strokes in response to the operation of the flow control valve 352.

(9) The solenoid operated valve 332 is de-energized in response to the actuation of valve 354.

(10) The pilot pressure operated valve 340 is actuated in response to the initial buildup of pressure resulting from the de-energization of the solenoid valve 332 to thereby exhaust pilot pressure from the valves 342, 344, 346 and 348.

(11) The return stroke of the piston and cylinder units 226 and 240 of the top and bottom stapling heads 224 and 238 respectively is commenced in response to the deactuation of valves 342, 344, 346 and 348.

(12) The raising movement of the top stapling head 224 is commenced at a time subsequent to the actuation of valve 340 sufficient to permit retraction of the clincher arms of the stapling heads by pressure buildup in response to the de-energization of valve 332.

(13) The coil of the stepping switch 396 is energized in response to the actuation of the switch 354 to thereby move the switch arms 408, 410 and 412 one step.

(14) Pressure responsive switch 354 is de-actuated at a predetermined time period after the de-actuation of valve 340 sufficient to permit the initial retraction of the clincher arms of the stapling heads and an initial movement of the top stapling head upwardly away from the top of the carton in response to the operation of flow control valve 350.

(15) The coil of relay 3R is energized in response to the de-actuation of pressure responsive valve 354 to thereby open switch contact 3RS2 and to close switch contact 3RS1. (Since switch S1 is open, this circuit is completed either through switch S2, switch S3, or switch S6, depending upon the width of the carton engaged by the conveying mechanisms 14 and the position of manual selector switch 402, as will be explained hereinafter.)

(16) The coil of relay 2R is energized in response to the closing of switch contact 3RS1 to close switch contact 2RS1 and open switch contact 2RS2.

(17) Clutch coil 380 is energized and break coil 382 is de-energized in response to the closing and opening of switch contact 2RS1 and 2RS2, respectively, to thereby drivingly connect the belt assemblies 14 with the motor 98 through the operation of the electromagnetic clutch-brake unit 100 completing the stapling cycle by restarting the movement of the carton.

The subsequent operation of the machine is dependent upon the width size of the box engaged by the belt assemblies 14. To illustrate this operation, it will be assumed that switch 398 is actuated and remains actuated when the belt assemblies are in engagement with a box having a width of 14" or less and that the switch 400 is closed when the belt assemblies are in engagement with a carton having a width of 8" or less. Thus, in this exemplary embodiment, with cartons having a width above 14", as for example up to 24", switch 398 will remain in its normal position which renders the first level switch arm 408 operative. The first level switch arm 408 is operative to effect five successive stapling cycles which are initiated respectively by the switches S2 through S6.

It will be noted that the stapling cycle at each of the first five steps of the stepping switch 396 will be initiated by the opening of the associated switch S, and as previously described, the position at which the carton is stopped to initiate the cycle, which in turn determines the position at which the staple is driven into the carton, is determined by the position of the switches S2–S5.

It is also important to note that the initiation of the next stapling cycle need not be delayed until after the top stapling head has reached its uppermost limiting position. Advantageously, the arrangement is such that the top stapling head will start down when the stapling cycle is initiated irrespective of the vertical position of the stapling head. As previously stated, the position of the switches S2–S5 vary in proportion to the width of the carton so that in the exemplary embodiment set forth above switch S2 would determine the position of the second staple to be 5" from the leading end staple and switch S3 would determine the position of the third staple to be 5" from the second staple when a 24"-wide carton is engaged by the conveying mechanism 14. In a like manner, a similar pattern of staples would be driven into the trailing end flap through the operation of switches S4, S5 and S6.

With this arrangement the staples in the largest width size carton accommodated by the machine would have a predetermined maximum spacing between adjacent staples with one staple being positioned within 1" of the associated end of the carton and one staple positioned within 1" of the free end of the associated end flap. The predetermined maximum distance would be chosen to be equal to the maximum distance required by the Uniform Freight Classification Code which at present is 5". Since the switches S2–S5 are moved proportionate to the width of the carton for a 14" carton, the pattern of staples in each end flap would have a spacing between adjacent staples of 2½" and there would still be a staple within one inch of the associated carton end and within 1" of the free edge of the associated end flap.

Where the carton engaged by the conveying mechanisms 14 has a width size less than 14", the second level switch arm 410 is operative since switch 398 will be actuated to bypass the first level switch arm 408. The second level switch arm 410 is operative to effect three successive staple cycles which are initiated by the switches S3, S4 and S6. As before, the stapling cycle in each of the first three steps of the stepping switch 396 will be initiated by the opening of the associated switch S. In effect, the operation of the second level stepping switch arm 410 bypasses the operation of switches S2 and S5. Thus, for a 14" width size carton having an end flap of 7", the position of the second staple, which is determined by the position of switch S3, will be spaced 5" from the first staple. Here, again, the predetermined maximum spacing is maintained between adjacent staples and a staple is deposited within 1" of the associated end of the carton and within 1" of the free edge of the associated end flap. For a 6" wide carton, the spacing of 1" between adjacent staples would be provided and still the relationship of a staple within 1" of each transverse edge of the associated end flap is maintained.

The selector switch 402 is normally maintained in an open position. However, where a minimum sealing of small width cartons is desired, the manual selector switch 402 may be closed which will render the third level arm 412 operable. In the exemplary embodiment set forth above, the third level switch arm 412 would be operative when the carton engaged by the belt mechanisms 14 has a width of 8" or less, since in order for switch arm 412 to be operable switch 400 must be closed. The third level switch arm 412 is operative to effect only a single stapling cycle which is initiated by the switch S6. It will be noted that while the circuit to second level switch arm 410 is not bypassed when the third level switch arm 412 is operable by closing the manual selector switch 402, the second level switch arm 410 is not operable when switch S3 is opened since the circuit to the coil of relay 3R is completed through the switch arm 412. Consequently, the stapling cycle will not be initiated until switch S6 is open. Thus, when the third level switch arm 412 is operable, only two staples will be driven into the carton, namely, one within 1" of each end thereof.

After the completion of the last stapling cycle, as shown in FIGURE 21, valve 322 will be engaged by the leading end of the carton, as shown in FIGURE 22, which moves into a position closing off communication of pilot pressure to the valve 324 and exhausting the pilot pressure between valve 322 and 324 to the atmosphere. Next, valve 324 is actuated to move it into its open position. Consequently, when the trailing end of the carton leaves the valve 322 permitting it to return into its normal position in communication with the valve 324 pilot pressure to the valves 306 and 308 will be exhausted to atmosphere. The de-actuation of valves 306 and 308 reverses the flow to piston and cylinder unit 68 to extend the latter and thus move the conveying mechanisms 14 outwardly toward its outermost position. As the belt assemblies 14 reach their outermost limiting position, switch 418 is closed which completes the reset circuit to the coil of the stepping switch 396. Interruptor switch 414 is operable to continuously cycle the energization of the coil of the stepping switch until the zero or home position of the switch is reached, at which time zero switch 416 is opened. Also, as the conveying mechanisms 14 move outwardly into their outermost position, as shown in FIGURE 23, switch 378 is closed, which starts the entire cycle of operation over again by actuating the in-feed conveyor 371.

The machine 10 described above constitutes the preferred embodiment of the present invention and is particularly suited for efficient operation with cartons of intermixed sizes having their bottom flaps closed but unsealed and their top flaps opened. It will be understood, however, that the various mechanisms embodied in the overall machine could be utilized in handling cartons under different conditions. For example, where the bottom flaps of the cartons are sealed prior to being fed to the machine, the bottom stapling mechanism may be eliminated. In this regard, a suitable lock-out valve or switch may be provided in the present machine to prevent automatic operation of the bottom stapling mechanism when cartons are fed to the machine having sealed bottom flaps. Likewise, the flap folding mechanism may be eliminated or locked out where the cartons fed to the machine have both the top and bottom flaps closed, but unsealed. Finally, the flap folding mechanism may be utilized with sealing mechanisms other than stapling mechanisms, as, for example, gluing mechanisms or tape applying mechanisms.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. Apparatus for stapling closed cartons of varying sizes of the type closed by folding a pair of end flaps from a parallel outwardly extending opened position inwardly into a coplanar closed position and then folding a pair of side flaps from a parallel outwardy extending opened position inwardly into a closed coplanar position disposed in abutting overlying relation to the end flaps, the dimension of said flaps measured in the direction of the outward extent thereof when in said open position being generally equal to one-half the width of said carton, comprising staple driving means operable to drive staples, means for effecting a relative longitudinal movement between each successive carton and said staple driving means, means for sensing the width of each successive carton, and means operable in response to said carton width sensing means for operating said relative movement effecting means to effect a plurality of relative movements between each successive carton and said staple driving means into a plurality of different positions of cooperating relation with respect to each other which vary in accordance with the width of the carton and for operating said staple driving means while in said positions of cooperating relation with respect to said carton to drive staples only into the portions of the side flaps overlapping the end flaps at spaced positions corresponding to the width of the carton such that at least two staples are driven into each end flap, one of which is disposed within approximately one inch of the adjacent end of the carton and adjacent staples in each end flap are spaced apart no greater than a predetermined distance.

2. Apparatus for stapling closed cartons of varying sizes of the type closed by folding a pair of end flaps from a parallel outwardly extending opened position inwardly into a coplanar closed position and then folding a pair of side flaps from a parallel outwardly extending opened position inwardly into a closed coplanar position disposed in abutting overlying relation to the end flaps, the dimension of said flaps measured in the direction of the outward extent thereof when in said open position being generally equal to one-half the width of said carton, comprising staple driving means operable to drive staples, means for effecting a relative longitudinal movement between each successive carton and said staple driving means, means for sensing the width of each succesive carton, a plurality of first means operable in response to the sensing of the presence of the leading end of a carton as a result of relative longitudinal movement between said carton and said staple driving means by said relative movement effecting means into a plurality of different longitudinally spaced relative positions with respect to said staple driving means for operating said staple driving means to drive staples into the side flaps and underlying leading end flap of said carton at corresponding longitudinal spaced positions therein, a plurality of second means operable in response to the sensing of the presence of the trailing end of said carton into a plurality of different longitudinal spaced relative positions with respect to said staple driving means for operating said staple driving means to drive staples into the side flaps and underlying trailing end flap of said carton at corresponding longitudinal spaced positions theren, and means operable in response to said carton width sensing means for varying the longitudinal spacing of the different relative positions between the staple driving means and the respective end of the carton to which the respective first and second means are responsively operable so that said staple driving means is operated to drive staples into the side flaps and the underlying end flaps only of each successive carton at positions spaced longitudinally in accordance with the width of the carton in which the staples associated with each end flap are spaced apart a distance not exceeding a predetermined distance and at least one of which is within approximately one inch from the adjacent end of the carton.

3. Apparatus as defined in claim 2 wherein said plurality of first means includes at least three longitudinally spaced first means, said plurality of second means includes at least three longitudinally spaced second means, and wherein said means operable in response to the carton sensing means includes means for varying the longitudinal spacing between the three first means and the three second means in proportion to the width of the carton sensed by said carton width sensing means and means operable in response to the sensing of a carton having a width less than a predetermined intermediate width within the operative size range thereof for rendering the intermediate first means and the intermediate second means inoperable.

4. Apparatus as defined in claim 3 wherein the initially operable first means and the last operable second means are disposed in fixed longitudinal relation with respect to said staple driving means so as to be operable to drive staples into the side flaps and underlying end flaps of successive cartons at positions within one inch of the associated end flap adjacent the associated carton end.

5. Apparatus as defined in claim 4 including manually operable means for rendering all of the plurality of first means and the plurality of second means inoperable other than the initially operable first means and the last operable second means.

6. Apparatus for stapling the closed tops of cartons of varying sizes comprising frame means, a stapling head carried by said frame means adapted to be actuated to drive staple means into a carton top to secure the same in closed relation, conveying means carried by said frame means for conveying successive cartons into a plurality of stapling positions beneath said stapling head, said conveying means including carton bottom supporting means extending generally horizontally in spaced relation below said head a distance sufficient to permit passage of cartons beneath said head within an operative size range, means mounting said stapling head for vertical movement between an upper limiting position wherein said stapling head is disposed at a vertical position above said carton bottom supporting means a distance greater than the highest carton within said operative size range and the lower limiting position wherein the stapling head is disposed at a vertical position above said carton bottom supporting means a distance less than the lowest carton within said operative size range, power operated means for effecting downward movement of said stapling head toward said lower limiting position and upward movement of said stapling head toward said upper limiting position, means operable in response to the movement of a carton by said conveying means into a first stapling position beneath said stapling head when the latter is disposed in said upper limiting position for actuating said power operated means to move said stapling head downwardly from said upper limiting position toward said lower limiting position to engage the top of the carton in said first stapling position, means operable in response to the engagement of the carton top by said stapling head for sequentially (1) actuating said power operated means to stop the downward movement of said stapling head in engagement with the carton top, (2) actuating the stapling head to drive staple means into the carton top, and (3) actuating said power operated means to move the stapling head upwardly from its position of engagement with the carton top toward said upper limiting position, and means operable in response to the movement of the carton successively into the remainder of said plurality of stapling positions by said conveying means for actuating said power operated means to move said stapling head downwardly toward said lower limiting position into engagemnt with the carton top in the respective stapling position irrespective of the position of upward movement said stapling head has reached at the time of such actuation of said power operated means as a result of the previous actuation thereof so that said stapling head can be successively actuated to drive staple means into the top of the carton at successive stapling positions without the necessity of said stapling head being moved upwardly into its upper limiting position between successive staple means driving operations thereby minimizing the time required to move successive cartons through all of said stapling positions in said conveying mechanism.

7. Apparatus as defined in claim 6 wherein said power operated means comprises a first double acting pneumatic piston and cylinder unit and wherein said means operable in response to the engagement of the carton top comprises pneumatically actuated means operatively connected with one side of said piston and cylinder unit for actuating said staple head to drive staple means into the carton top in response to the establishment of a predetermined pressure condition within said cylinder side resulting from the engagement of said stapling head with said carton top during the downward movement of said stapling head.

8. Apparatus as defined in claim 7 wherein said stapling head includes a second double acting pneumatic piston and cyclinder unit movable through a power stroke for driving the staple means and through a return stroke and wherein said pneumatically actuated means includes valve means movable into a first position in response to said predetermined pressure condition and movable into a second position in response to a second predetermined pressure condition within said cylinder side occasioned by the flow of fluid pressure to said first piston and cylinder unit in a direction to move said stapling head upwardly and means operable in response to the movement of said valve means into said first position for effecting the driving stroke of said second piston and cylinder unit and in response to the movement of said valve means into said second position for effecting the return stroke of said second piston and cylinder unit, and timing means operable a predetermined time after the movement of said valve means into said first position for controlling the flow of fluid pressure to said first piston and cylinder unit to effect movement of said stapling head upwardly.

9. Apparatus as defined in claim 8 wherein said timing means comprises a fluid pressure responsive switch operatively connected with said valve means to be actuated a predetermined time after the movement of said valve means into said first position.

10. Apparatus as defined in claim 9 including adjustable fluid pressure flow control means between said valve means and said pressure operated switch for varying the time of actuation of said switch.

References Cited

UNITED STATES PATENTS

| | | | |
|---|---|---|---|
| 2,324,401 | 7/1943 | Kimball | 53—75 |
| 3,126,685 | 3/1964 | Paxton et al. | 227—102 |
| 3,158,869 | 12/1964 | Jackson et al. | 227—7 |
| 3,183,639 | 5/1965 | Rodman | 53—75 |
| 3,267,640 | 8/1966 | Romney et al. | 53—75 |
| 3,340,847 | 9/1967 | Miller et al. | 53—75 XR |

GRANVILLE Y. CUSTER, JR., Primary Examiner

U.S. Cl. X.R.

227—101, 153; 53—75

PO-1050
(5/69)

UNITED STATES PATENT OFFICE
CERTIFICATE OF CORRECTION

Patent No. 3,502,256                    Dated  March 24, 1970

Inventor(s)   Henri A. BOULAY and Joseph SILVA

It is certified that error appears in the above-identified patent and that said Letters Patent are hereby corrected as shown below:

The date of issue of the patent should read "March 24, 1970", on the Official Grant.

SIGNED AND
SEALED
AUG 11 1970

(SEAL)
Attest:

Edward M. Fletcher, Jr.
Attesting Officer

WILLIAM E. SCHUYLER, JR.
Commissioner of Patents